US012100280B2

(12) United States Patent
Young et al.

(10) Patent No.: US 12,100,280 B2
(45) Date of Patent: Sep. 24, 2024

(54) SYSTEMS AND METHODS FOR SOFTWARE DEFINED FIRE DETECTION AND RISK ASSESSMENT

(71) Applicant: Tyco Fire & Security GmbH, Schaffhausen (CH)

(72) Inventors: James Young, Cork (IE); Sudhi R. Sinha, Milwaukee, WI (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 249 days.

(21) Appl. No.: 17/167,049

(22) Filed: Feb. 3, 2021

(65) Prior Publication Data

US 2021/0241595 A1 Aug. 5, 2021

Related U.S. Application Data

(60) Provisional application No. 62/969,957, filed on Feb. 4, 2020.

(51) Int. Cl.

| | |
|---|---|
| ***G08B 17/113*** | (2006.01) |
| ***F24F 11/89*** | (2018.01) |
| ***G08B 17/06*** | (2006.01) |

(52) U.S. Cl.

CPC ............ *G08B 17/113* (2013.01); *F24F 11/89* (2018.01); *G08B 17/06* (2013.01)

(58) Field of Classification Search

None

See application file for complete search history.

(56) References Cited

U.S. PATENT DOCUMENTS

| | | | |
|---|---|---|---|
| 5,301,109 | A | 4/1994 | Landauer et al. |
| 5,446,677 | A | 8/1995 | Jensen et al. |
| 5,581,478 | A | 12/1996 | Cruse et al. |
| 5,812,962 | A | 9/1998 | Kovac |
| 5,960,381 | A | 9/1999 | Singers et al. |

(Continued)

FOREIGN PATENT DOCUMENTS

| | | | |
|---|---|---|---|
| CN | 101415011 | A | 4/2009 |
| CN | 102136099 | A | 7/2011 |

(Continued)

OTHER PUBLICATIONS

Author/Publisher: IBM.com, Title: Cloud Server, Date: Jan. 4, 2020, Pertinent Pages: whole document (Year: 2020).*

(Continued)

*Primary Examiner* — Muhammad Adnan

(74) *Attorney, Agent, or Firm* — Foley & Lardner LLP

(57) ABSTRACT

One or more non-transitory computer-readable storage media having instructions stored thereon that, when executed by one or more processors, cause the one or more processors to implement a software defined alarm control unit (SDACU) to augment an existing fire panel, the SDACU configured to receive, from one or more sensors distributed within a building via the existing fire panel, a fire detection signal, generate, based on the fire detection signal, an operating command for one or more fire response devices associated with the building, and generate a graphical representation of the building, the graphical representation including a status of at least one of the one or more fire response devices.

20 Claims, 13 Drawing Sheets

(56) References Cited

U.S. PATENT DOCUMENTS

| | | | |
|---|---|---|---|
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,171,586 | B2 | 1/2019 | Shaashua et al. |
| 10,187,258 | B2 | 1/2019 | Nagesh et al. |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,705,492 | B2 | 7/2020 | Harvey |
| 10,708,078 | B2 | 7/2020 | Harvey |
| 10,845,771 | B2 | 11/2020 | Harvey |
| 10,854,194 | B2 | 12/2020 | Park et al. |
| 10,862,928 | B1 | 12/2020 | Badawy et al. |
| 10,921,760 | B2 | 2/2021 | Harvey |
| 10,921,972 | B2 | 2/2021 | Park et al. |
| 10,969,133 | B2 | 4/2021 | Harvey |
| 10,986,121 | B2 | 4/2021 | Stockdale et al. |
| 11,016,998 | B2 | 5/2021 | Park et al. |
| 11,024,292 | B2 | 6/2021 | Park et al. |
| 11,038,709 | B2 | 6/2021 | Park et al. |
| 11,070,390 | B2 | 7/2021 | Park et al. |
| 11,073,976 | B2 | 7/2021 | Park et al. |
| 11,108,587 | B2 | 8/2021 | Park et al. |
| 11,113,295 | B2 | 9/2021 | Park et al. |
| 11,229,138 | B1 | 1/2022 | Harvey et al. |
| 11,284,544 | B1 * | 3/2022 | Lingle ................. G06F 11/3006 |
| 11,314,726 | B2 | 4/2022 | Park et al. |
| 11,314,788 | B2 | 4/2022 | Park et al. |
| 2002/0010562 | A1 | 1/2002 | Schleiss et al. |
| 2002/0016639 | A1 | 2/2002 | Smith et al. |
| 2002/0059229 | A1 | 5/2002 | Natsumeda et al. |
| 2002/0123864 | A1 | 9/2002 | Eryurek et al. |
| 2002/0147506 | A1 | 10/2002 | Eryurek et al. |
| 2002/0177909 | A1 | 11/2002 | Fu et al. |
| 2003/0005486 | A1 | 1/2003 | Ridolfo et al. |
| 2003/0014130 | A1 | 1/2003 | Grumelart |
| 2003/0073432 | A1 | 4/2003 | Meade, II |
| 2003/0158704 | A1 | 8/2003 | Triginai et al. |
| 2003/0171851 | A1 | 9/2003 | Brickfield et al. |
| 2003/0200059 | A1 | 10/2003 | Ignatowski et al. |
| 2004/0068390 | A1 | 4/2004 | Saunders |
| 2004/0128314 | A1 | 7/2004 | Katibah et al. |
| 2004/0133314 | A1 | 7/2004 | Ehlers et al. |
| 2004/0199360 | A1 | 10/2004 | Friman et al. |
| 2005/0055308 | A1 | 3/2005 | Meyer et al. |
| 2005/0108262 | A1 | 5/2005 | Fawcett et al. |
| 2005/0154494 | A1 | 7/2005 | Ahmed |
| 2005/0278703 | A1 | 12/2005 | Lo et al. |
| 2005/0283337 | A1 | 12/2005 | Sayal |
| 2006/0095521 | A1 | 5/2006 | Patinkin |
| 2006/0140207 | A1 | 6/2006 | Eschbach et al. |
| 2006/0184479 | A1 | 8/2006 | Levine |
| 2006/0200476 | A1 | 9/2006 | Gottumukkala et al. |
| 2006/0265751 | A1 | 11/2006 | Cosquer et al. |
| 2006/0271589 | A1 | 11/2006 | Horowitz et al. |
| 2007/0028179 | A1 | 2/2007 | Levin et al. |
| 2007/0203693 | A1 | 8/2007 | Estes |
| 2007/0261062 | A1 | 11/2007 | Bansal et al. |
| 2007/0273497 | A1 | 11/2007 | Kuroda et al. |
| 2007/0273610 | A1 | 11/2007 | Baillot |
| 2008/0034425 | A1 | 2/2008 | Overcash et al. |
| 2008/0094230 | A1 | 4/2008 | Mock et al. |
| 2008/0097816 | A1 | 4/2008 | Freire et al. |
| 2008/0186160 | A1 | 8/2008 | Kim et al. |
| 2008/0249756 | A1 | 10/2008 | Chaisuparasmikul |
| 2008/0252723 | A1 | 10/2008 | Park |
| 2008/0281472 | A1 | 11/2008 | Podgorny et al. |
| 2009/0195349 | A1 | 8/2009 | Frader-Thompson et al. |
| 2010/0045439 | A1 | 2/2010 | Tak et al. |
| 2010/0058248 | A1 | 3/2010 | Park |
| 2010/0131533 | A1 | 5/2010 | Ortiz |
| 2010/0274366 | A1 | 10/2010 | Fata et al. |
| 2010/0281387 | A1 | 11/2010 | Holland et al. |
| 2010/0286937 | A1 | 11/2010 | Hedley et al. |
| 2010/0324962 | A1 | 12/2010 | Nesler et al. |
| 2011/0015802 | A1 | 1/2011 | Imes |
| 2011/0047418 | A1 | 2/2011 | Drees et al. |

(56) References Cited

U.S. PATENT DOCUMENTS

2011/0061015 A1 3/2011 Drees et al.
2011/0071685 A1 3/2011 Huneycutt et al.
2011/0077950 A1 3/2011 Hughston
2011/0087650 A1 4/2011 Mackay et al.
2011/0087988 A1 4/2011 Ray et al.
2011/0088000 A1 4/2011 Mackay
2011/0125737 A1 5/2011 Pothering et al.
2011/0137853 A1 6/2011 Mackay
2011/0153603 A1 6/2011 Adiba et al.
2011/0154363 A1 6/2011 Karmarkar
2011/0157357 A1 6/2011 Weisensale et al.
2011/0178977 A1 7/2011 Drees
2011/0191343 A1 8/2011 Heaton et al.
2011/0205022 A1 8/2011 Cavallaro et al.
2011/0218777 A1 9/2011 Chen et al.
2012/0011126 A1 1/2012 Park et al.
2012/0011141 A1 1/2012 Park et al.
2012/0022698 A1 1/2012 Mackay
2012/0062577 A1 3/2012 Nixon
2012/0064923 A1 3/2012 Imes et al.
2012/0083930 A1 4/2012 Ilic et al.
2012/0100825 A1 4/2012 Sherman et al.
2012/0101637 A1 4/2012 Imes et al.
2012/0135759 A1 5/2012 Imes et al.
2012/0136485 A1 5/2012 Weber et al.
2012/0158633 A1 6/2012 Eder
2012/0259583 A1 10/2012 Noboa et al.
2012/0272228 A1 10/2012 Marndi et al.
2012/0278051 A1 11/2012 Jiang et al.
2013/0007063 A1 1/2013 Kalra et al.
2013/0038430 A1 2/2013 Blower et al.
2013/0038707 A1 2/2013 Cunningham et al.
2013/0060820 A1 3/2013 Bulusu et al.
2013/0085917 A1* 4/2013 Agarwal ................ G06Q 40/06 705/35
2013/0086497 A1 4/2013 Ambuhl et al.
2013/0097276 A1* 4/2013 Sridhar ................... H04L 67/12 709/217
2013/0097706 A1 4/2013 Titonis et al.
2013/0103221 A1 4/2013 Raman et al.
2013/0167035 A1 6/2013 Imes et al.
2013/0170710 A1 7/2013 Kuoch et al.
2013/0204836 A1 8/2013 Choi et al.
2013/0246916 A1 9/2013 Reimann et al.
2013/0247205 A1 9/2013 Schrecker et al.
2013/0262035 A1 10/2013 Mills
2013/0275174 A1 10/2013 Bennett et al.
2013/0275908 A1 10/2013 Reichard
2013/0297050 A1 11/2013 Reichard et al.
2013/0298244 A1 11/2013 Kumar et al.
2013/0304508 A1* 11/2013 Shah ...................... G16H 10/60 705/3
2013/0331995 A1 12/2013 Rosen
2014/0031082 A1* 1/2014 Zishaan ................. G08B 21/14 455/556.1
2014/0032506 A1 1/2014 Hoey et al.
2014/0059483 A1 2/2014 Mairs et al.
2014/0081652 A1 3/2014 Klindworth
2014/0135952 A1 5/2014 Maehara
2014/0152651 A1 6/2014 Chen et al.
2014/0172184 A1 6/2014 Schmidt et al.
2014/0189861 A1 7/2014 Gupta et al.
2014/0207282 A1 7/2014 Angle et al.
2014/0258052 A1 9/2014 Khuti et al.
2014/0269614 A1 9/2014 Maguire et al.
2014/0277765 A1 9/2014 Karimi et al.
2014/0278461 A1 9/2014 Artz
2014/0327555 A1 11/2014 Sager et al.
2015/0019174 A1 1/2015 Kiff et al.
2015/0042240 A1 2/2015 Aggarwal et al.
2015/0105917 A1 4/2015 Sasaki et al.
2015/0145468 A1 5/2015 Ma et al.
2015/0156031 A1 6/2015 Fadell et al.
2015/0168931 A1 6/2015 Jin
2015/0172300 A1 6/2015 Cochenour
2015/0178421 A1 6/2015 Borrelli et al.
2015/0185261 A1 7/2015 Frader-Thompson et al.
2015/0186777 A1 7/2015 Lecue et al.
2015/0202962 A1 7/2015 Habashima et al.
2015/0204563 A1 7/2015 Imes et al.
2015/0235267 A1 8/2015 Steube et al.
2015/0241895 A1 8/2015 Lu et al.
2015/0244730 A1 8/2015 Vu et al.
2015/0244732 A1 8/2015 Golshan et al.
2015/0261863 A1 9/2015 Dey et al.
2015/0263900 A1 9/2015 Polyakov et al.
2015/0286969 A1 10/2015 Warner et al.
2015/0295796 A1 10/2015 Hsiao et al.
2015/0304193 A1 10/2015 Ishii et al.
2015/0316918 A1 11/2015 Schleiss et al.
2015/0324422 A1 11/2015 Elder
2015/0341212 A1 11/2015 Hsiao et al.
2015/0348417 A1 12/2015 Ignaczak et al.
2015/0379080 A1 12/2015 Jochimski
2016/0011753 A1 1/2016 McFarland et al.
2016/0033946 A1 2/2016 Zhu et al.
2016/0035246 A1 2/2016 Curtis
2016/0065601 A1 3/2016 Gong et al.
2016/0070736 A1 3/2016 Swan et al.
2016/0078229 A1 3/2016 Gong et al.
2016/0090839 A1 3/2016 Stolarczyk
2016/0119434 A1 4/2016 Dong et al.
2016/0127712 A1 5/2016 Alfredsson et al.
2016/0139752 A1 5/2016 Shim et al.
2016/0163186 A1 6/2016 Davidson et al.
2016/0170390 A1 6/2016 Xie et al.
2016/0171862 A1 6/2016 Das et al.
2016/0173816 A1 6/2016 Huenerfauth et al.
2016/0179315 A1 6/2016 Sarao et al.
2016/0179342 A1 6/2016 Sarao et al.
2016/0179990 A1 6/2016 Sarao et al.
2016/0195856 A1 7/2016 Spero
2016/0212165 A1 7/2016 Singla et al.
2016/0239660 A1 8/2016 Azvine et al.
2016/0239756 A1 8/2016 Aggour et al.
2016/0313751 A1 10/2016 Risbeck et al.
2016/0313752 A1 10/2016 Przybylski
2016/0313902 A1 10/2016 Hill et al.
2016/0350364 A1 12/2016 Anicic et al.
2016/0357828 A1 12/2016 Tobin et al.
2016/0358432 A1 12/2016 Branscomb et al.
2016/0363336 A1 12/2016 Roth et al.
2016/0370258 A1 12/2016 Perez
2016/0378306 A1 12/2016 Kresl et al.
2016/0379326 A1 12/2016 Chan-Gove et al.
2017/0006135 A1 1/2017 Siebel
2017/0011318 A1 1/2017 Vigano et al.
2017/0017221 A1 1/2017 Lamparter et al.
2017/0039255 A1 2/2017 Raj et al.
2017/0052536 A1 2/2017 Warner et al.
2017/0053441 A1 2/2017 Nadumane et al.
2017/0061747 A1* 3/2017 Christianson .......... G08B 25/10
2017/0063894 A1 3/2017 Muddu et al.
2017/0068409 A1 3/2017 Nair
2017/0070775 A1 3/2017 Taxier et al.
2017/0075984 A1 3/2017 Deshpande et al.
2017/0084168 A1 3/2017 Janchookiat
2017/0090437 A1 3/2017 Veeramani et al.
2017/0093700 A1 3/2017 Gilley et al.
2017/0098086 A1 4/2017 Hoernecke et al.
2017/0103327 A1 4/2017 Penilla et al.
2017/0103403 A1 4/2017 Chu et al.
2017/0123389 A1 5/2017 Baez et al.
2017/0134415 A1 5/2017 Muddu et al.
2017/0177715 A1 6/2017 Chang et al.
2017/0180147 A1 6/2017 Brandman et al.
2017/0188216 A1 6/2017 Koskas et al.
2017/0212482 A1 7/2017 Boettcher et al.
2017/0212668 A1 7/2017 Shah et al.
2017/0220641 A1 8/2017 Chi et al.
2017/0230930 A1 8/2017 Frey
2017/0235817 A1 8/2017 Deodhar et al.
2017/0251182 A1 8/2017 Siminoff et al.
2017/0270124 A1 9/2017 Nagano et al.

(56) References Cited

U.S. PATENT DOCUMENTS

| | | | | |
|---|---|---|---|---|
| 2017/0277769 | A1 | 9/2017 | Pasupathy et al. | |
| 2017/0278003 | A1 | 9/2017 | Liu | |
| 2017/0294132 | A1 | 10/2017 | Colmenares | |
| 2017/0315522 | A1 | 11/2017 | Kwon et al. | |
| 2017/0315697 | A1 | 11/2017 | Jacobson et al. | |
| 2017/0322534 | A1 | 11/2017 | Sinha et al. | |
| 2017/0323389 | A1 | 11/2017 | Vavrasek | |
| 2017/0329289 | A1 | 11/2017 | Kohn et al. | |
| 2017/0336770 | A1 | 11/2017 | Macmillan | |
| 2017/0345287 | A1 | 11/2017 | Fuller et al. | |
| 2017/0351957 | A1 | 12/2017 | Lecue et al. | |
| 2017/0357225 | A1 | 12/2017 | Asp et al. | |
| 2017/0357490 | A1 | 12/2017 | Park et al. | |
| 2017/0357908 | A1 | 12/2017 | Cabadi et al. | |
| 2018/0012159 | A1 | 1/2018 | Kozloski et al. | |
| 2018/0013579 | A1 | 1/2018 | Fairweather et al. | |
| 2018/0024520 | A1 | 1/2018 | Sinha et al. | |
| 2018/0039238 | A1 | 2/2018 | Gartner et al. | |
| 2018/0048485 | A1 | 2/2018 | Pelton et al. | |
| 2018/0069932 | A1 | 3/2018 | Tiwari et al. | |
| 2018/0114140 | A1 | 4/2018 | Chen et al. | |
| 2018/0137288 | A1 | 5/2018 | Polyakov | |
| 2018/0157930 | A1 | 6/2018 | Rutschman et al. | |
| 2018/0162400 | A1 | 6/2018 | Abdar | |
| 2018/0176241 | A1 | 6/2018 | Manadhata et al. | |
| 2018/0198627 | A1 | 7/2018 | Mullins | |
| 2018/0200552 | A1* | 7/2018 | Wertsberger | A62C 37/40 |
| 2018/0203961 | A1 | 7/2018 | Aisu et al. | |
| 2018/0239982 | A1 | 8/2018 | Rutschman et al. | |
| 2018/0275625 | A1 | 9/2018 | Park et al. | |
| 2018/0276962 | A1 | 9/2018 | Butler et al. | |
| 2018/0292797 | A1 | 10/2018 | Lamparter et al. | |
| 2018/0336785 | A1 | 11/2018 | Ghannam et al. | |
| 2018/0343562 | A1* | 11/2018 | Nalukurthy | H04L 63/0838 |
| 2018/0359111 | A1 | 12/2018 | Harvey | |
| 2018/0364654 | A1 | 12/2018 | Locke et al. | |
| 2019/0005025 | A1 | 1/2019 | Malabarba | |
| 2019/0013023 | A1 | 1/2019 | Pourmohammad et al. | |
| 2019/0025771 | A1 | 1/2019 | Park et al. | |
| 2019/0037135 | A1 | 1/2019 | Hedge | |
| 2019/0042988 | A1 | 2/2019 | Brown et al. | |
| 2019/0043351 | A1* | 2/2019 | Yang | G06V 40/103 |
| 2019/0088106 | A1 | 3/2019 | Grundstrom | |
| 2019/0094824 | A1 | 3/2019 | Xie et al. | |
| 2019/0096214 | A1* | 3/2019 | Pourmohammad | G06N 20/20 |
| 2019/0096217 | A1* | 3/2019 | Pourmohammad | G06F 40/30 |
| 2019/0102840 | A1 | 4/2019 | Perl et al. | |
| 2019/0138512 | A1 | 5/2019 | Pourmohammad et al. | |
| 2019/0147883 | A1 | 5/2019 | Mellenthin et al. | |
| 2019/0158309 | A1 | 5/2019 | Park et al. | |
| 2019/0163152 | A1 | 5/2019 | Worrall et al. | |
| 2019/0259112 | A1* | 8/2019 | Siegman | G06F 16/29 |
| 2019/0268178 | A1 | 8/2019 | Fairweather et al. | |
| 2019/0310979 | A1 | 10/2019 | Masuzaki et al. | |
| 2019/0370089 | A1* | 12/2019 | Patton | G06F 9/542 |
| 2020/0029220 | A1* | 1/2020 | Chao | H04W 88/085 |
| 2020/0226156 | A1 | 7/2020 | Borra et al. | |
| 2020/0285203 | A1 | 9/2020 | Thakur et al. | |
| 2021/0042299 | A1 | 2/2021 | Migliori | |
| 2021/0381711 | A1 | 12/2021 | Harvey et al. | |
| 2021/0381712 | A1 | 12/2021 | Harvey et al. | |
| 2021/0382445 | A1 | 12/2021 | Harvey et al. | |
| 2021/0383041 | A1 | 12/2021 | Harvey et al. | |
| 2021/0383042 | A1 | 12/2021 | Harvey et al. | |
| 2021/0383200 | A1 | 12/2021 | Harvey et al. | |
| 2021/0383219 | A1 | 12/2021 | Harvey et al. | |
| 2021/0383235 | A1 | 12/2021 | Harvey et al. | |
| 2021/0383236 | A1 | 12/2021 | Harvey et al. | |
| 2022/0019186 | A1* | 1/2022 | De Andrade | G06N 5/02 |
| 2022/0028235 | A1* | 1/2022 | Saldin | G08B 13/1966 |
| 2022/0066402 | A1 | 3/2022 | Harvey et al. | |
| 2022/0066405 | A1 | 3/2022 | Harvey | |
| 2022/0066432 | A1 | 3/2022 | Harvey et al. | |
| 2022/0066434 | A1 | 3/2022 | Harvey et al. | |
| 2022/0066528 | A1 | 3/2022 | Harvey et al. | |
| 2022/0066722 | A1 | 3/2022 | Harvey et al. | |
| 2022/0066754 | A1 | 3/2022 | Harvey et al. | |
| 2022/0066761 | A1 | 3/2022 | Harvey et al. | |
| 2022/0067226 | A1 | 3/2022 | Harvey et al. | |
| 2022/0067227 | A1 | 3/2022 | Harvey et al. | |
| 2022/0067230 | A1 | 3/2022 | Harvey et al. | |
| 2022/0069863 | A1 | 3/2022 | Harvey et al. | |
| 2022/0070293 | A1 | 3/2022 | Harvey et al. | |
| 2022/0138684 | A1 | 5/2022 | Harvey | |
| 2022/0215264 | A1 | 7/2022 | Harvey et al. | |
| 2022/0366769 | A1* | 11/2022 | Sprakel | G08B 13/2462 |
| 2023/0010757 | A1 | 1/2023 | Preciado | |

FOREIGN PATENT DOCUMENTS

| | | | | |
|---|---|---|---|---|
| CN | 102136100 | A | | 7/2011 |
| CN | 102650876 | A | | 8/2012 |
| CN | 104040583 | A | | 9/2014 |
| CN | 104603832 | A | | 5/2015 |
| CN | 104919484 | A | | 9/2015 |
| CN | 106204392 | A | | 12/2016 |
| CN | 106406806 | A | | 2/2017 |
| CN | 106960269 | A | | 7/2017 |
| CN | 107147639 | A1 | | 9/2017 |
| CN | 107598928 | A | | 1/2018 |
| CN | 109829625 | A | * | 5/2019 |
| EP | 2 528 033 | A1 | | 11/2012 |
| EP | 3 324 306 | A1 | | 5/2018 |
| JP | H10-049552 | A | | 2/1998 |
| JP | 2003-162573 | A | | 6/2003 |
| JP | 2007-018322 | A | | 1/2007 |
| JP | 4073946 | B1 | | 4/2008 |
| JP | 2008-107930 | A | | 5/2008 |
| JP | 2013-152618 | A | | 8/2013 |
| JP | 2014-044457 | A | | 3/2014 |
| KR | 2016/0102923 | A | | 8/2016 |
| KR | 101914554 | B1 | * | 11/2018 |
| WO | WO-2009/020158 | A1 | | 2/2009 |
| WO | WO-2011/100255 | A2 | | 8/2011 |
| WO | WO-2013/050333 | A1 | | 4/2013 |
| WO | WO-2015/106702 | A1 | | 7/2015 |
| WO | WO-2015/145648 | A1 | | 10/2015 |
| WO | WO-2017/035536 | A1 | | 3/2017 |
| WO | WO-2017/192422 | A1 | | 11/2017 |
| WO | WO-2017/194244 | A1 | | 11/2017 |
| WO | WO-2017/205330 | A1 | | 11/2017 |
| WO | WO-2017/213918 | A1 | | 12/2017 |

OTHER PUBLICATIONS

Author/Publisher: Web Archive, Title: Crawled Calender; Captured Date: Dec. 16, 2022; Pertinent Pages: whole document (Year: 2022).*

Balaji et al, "Brick: Metadata schema for portable smart building applications," Applied Energy, 2018 (20 pages).

Balaji et al, "Brick: Metadata schema for portable smart building applications," Applied Energy, Sep. 15, 2018, 3 pages, (Abstract).

Balaji et al, "Demo Abstract: Portable Queries Using the Brick Schema for Building Applications," BuildSys '16, Palo Alto, CA, USA, Nov. 16-17, 2016 (2 pages).

Balaji, B et al., "Brick: Towards a Unified Metadata Schema For Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

Brick, "Brick: Towards a Unified Metadata Schema For Buildings," URL: chrome-extension://efaidnbmnnnibpcajpcglclefindmkaj/https://

(56) References Cited

OTHER PUBLICATIONS brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 22) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
EL Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation con-

(56) References Cited

OTHER PUBLICATIONS trol and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).

* cited by examiner

SYSTEMS AND METHODS FOR SOFTWARE DEFINED FIRE DETECTION AND RISK ASSESSMENT

CROSS-REFERENCE TO RELATED PATENT APPLICATIONS

This application claims the benefit and priority of U.S. Provisional Patent Application No. 62/969,957 filed on Feb. 4, 2020, the entire disclosure of which is incorporated by reference herein.

BACKGROUND

The present disclosure relates generally to building control systems and more particularly to a Fire Detection System (FDS) for a building. A FDS is, in general, a system of devices configured to control, monitor, and manage equipment in or around a building or building area to detect and suppress fires. An FDS can include, for example, a fire alerting system, a fire suppression system, and any other system that is capable of managing building fire safety functions or devices, or any combination thereof. The present disclosure relates more particularly to security platforms for handling alarms for the building, risk analytics, and risk mitigation.

Typically, a fire detection system is the first line of defense in protecting building occupants from possible fire dangers. An example of a conventional fire detection system 500 is illustrated in FIG. 5. The conventional fire detection systems typically consist of a fire panel 501 that monitors the status of sensors in predefined loops forming zones 503 and addressable loop devices 502. The sensors can include smoke and fire sensors 504, hose reel sensors 505, sprinkler sensors 506, and break glass or pull down sensors 507. Additionally, the fire panel 501 is enabled to control and monitor bell/sirens 508, doors 510, and shutters 509. The fire panel 501 is typically monitored by a computer system that can be managed in a centralized monitoring station 511.

Although, the conventional fire detection systems such as the first detection system 500 illustrated in FIG. 5 has been refined to become extremely robust, a number of issues persist. Firstly, the fire panel represents a central point of failure for the conventional fire detection system and replacing a failed fire panel requires reconfiguring the entire fire detection system. Secondly, large systems, at times, can be difficult to maintain, reconfigure, and update with the latest firmware and often requires on-site access to the fire panel. Still further, the conventional fire panels are configured for static operations and there is no provision to programmatically implement dynamic operational changes. Also, the software functionality is deployed as a firmware that is coupled to the hardware therefore, upgrading the conventional fire detection system to incorporate new features is generally achieved by upgrading the hardware through firmware, or replacing physical hardware. This makes keeping the entire process of system upgradation an expensive task.

Conventionally, security, operation and maintenance centers are required to handle high volume of event and alarm (threat) data generated by technologies connected to complex site-monitoring systems. Such technologies may include PCs, virtual memory systems, operating systems, and applications in a composite application management platform, IoT-based sensors, controllers, and other site-monitoring devices and systems including fire monitoring and detection systems. However, prioritizing such numerous events and alarms in a timely fashion can be a challenging task.

Focusing on fire detection, alarms and alerts, at best, have a static severity score. More commonly, they do not have any supporting severity score. However, the static severity score generated by the conventional fire detection systems and/or risk assessment systems are reliable only up to an extent as the volume of alerts and alarms tend to impact the response time and lead to ineffective allocation of resources for providing timely and required assistance.

There is, therefore, felt a need to provide methods and systems for software defined fire detection and risk assessment which alleviates the abovementioned drawbacks.

SUMMARY

One implementation of the present disclosure is one or more non-transitory computer-readable storage media having instructions stored thereon that, when executed by one or more processors, cause the one or more processors to implement a software defined alarm control unit (SDACU) to augment an existing fire panel, the SDACU configured to receive, from one or more sensors distributed within a building via the existing fire panel, a fire detection signal, generate, based on the fire detection signal, an operating command for one or more fire response devices associated with the building, and generate a graphical representation of the building, the graphical representation including a status of at least one of the one or more fire response devices.

In various embodiments, the fire detection signal is received from at least one of a glass break sensor, a pull-down sensor, a hose reel sensor, a smoke detector, a fire detector, a sprinkler sensor, or a heat detector. In various embodiments, the software defined alarm control unit (SDACU) is configured to continuously monitor at least one of the one or more sensors or the one or more fire response devices to determine the status. In various embodiments, continuously monitoring at least one of the one or more sensors or the one or more fire response devices includes monitoring a pipe mounted sensor to determine at least one of a water flow associated with the pipe, a debris accumulation associated with the pipe, a water temperature of water flowing through the pipe, or leakage associated with the pipe. In various embodiments, the operating command is configured to control at least one of a sprinkler, a window shutter, a door, an alarm, or an HVAC component. In various embodiments, the status indicates at least one of device removal, tampering, or unauthorized usage. In various embodiments, the graphical representation of the building includes an indication of one or more fire zones associated with the building.

Another implementation of the present disclosure is a method for fire detection in one or more zones of a building comprising receiving, by a software defined alarm control unit (SDACU) operating on a processing device from an existing fire panel, a fire detection signal, generating, by the SDACU, an operating command for one or more fire response devices associated with the building based on the fire detection signal, and generating, by the SDACU, a graphical representation of the building comprising a status of at least one of the one or more fire response devices.

In various embodiments, the software defined alarm control unit (SDACU) receives the fire detection signal from at least one of a glass break sensor, a pull-down sensor, a hose reel sensor, a smoke detector, a fire detector, a sprinkler, or a heat detector. In various embodiments, the software defined alarm control unit (SDACU) is configured to continuously monitor at least one of the one or more sensors or the one or more fire response devices to determine the status. In various embodiments, continuously monitoring at least one of the one or more sensors or the one or more fire response devices includes monitoring a pipe mounted sensor to determine at least one of a water flow associated with the pipe, a debris accumulation associated with the pipe, a water temperature of water flowing through the pipe, or leakage associated with the pipe. In various embodiments, the operating command controls at least one of a sprinkler, a window shutter, a door, an alarm, or an HVAC component. In various embodiments, the status indicates at least one of device removal, tampering, or unauthorized usage. In various embodiments, the graphical representation of the building includes an indication of the one or more zones.

Another implementation of the present disclosure is a fire detection system comprising a hard logic device configured to couple to an existing fire panel of a building and provide integration therewith and a software defined alarm control unit (SDACU) operating on a processing device that is communicably coupled to the hard logic device and configured to receive, from one or more sensors distributed within the building from the hard logic device, a fire detection signal, generate, based on the fire detection signal, an operating command for one or more fire response devices associated with the building, and generate a graphical representation of the building, the graphical representation including a status of at least one of the one or more fire response devices.

In various embodiments, the software defined alarm control unit (SDACU) receives the fire detection signal from at least one of a glass break sensor, a pull-down sensor, a hose reel sensor, a smoke detector, a fire detector, a sprinkler sensor, or a heat detector. In various embodiments, the software defined alarm control unit (SDACU) is configured to continuously monitor at least one of the one or more sensors or the one or more fire response devices to determine the status. In various embodiments, the operating command is configured to control at least one of a sprinkler, a window shutter, a door, an alarm, or an HVAC component. In various embodiments, the status indicates at least one of device removal, tampering, or unauthorized usage. In various embodiments, the graphical representation of the building includes an indication of one or more fire zones associated with the building.

Another implementation of the present disclosure is a fire detection system for a building having a plurality of zones defined therewithin, said system comprising a plurality of sensors spatially distributed within each of said zones, wherein each of said sensors is configured to periodically monitor a parameter indicative of detection of fire, and is further configured to generate one or more fire detection signals, wherein the fire detection signal comprises zone information indicating the zone in which the fire is detected, a plurality of fire suppression devices and a plurality of fire response devices associated with each of said zones, wherein each of said fire response devices and said fire suppression devices are configured to be operated in an actuation state or a de-actuated state, a fire panel comprising a hard logic device communicatively coupled with the plurality of sensors, the plurality of fire response devices, and the plurality of fire suppression devices, a software defined alarm control unit (SDACU) implemented using a server, said software defined alarm control unit is configured to perform a plurality of supervisory and management related tasks, and is further configured to generate an alert data, subsequent to reception of at least one fire detection signal via the hard logic device, generate an operating command to selectively operate one or more of said fire suppression devices and fire response devices, subsequent to reception of at least one fire detection signal via the hard logic device, and provide a graphical user interface to display the present status of each zones, the plurality of sensors, the fire response devices, and the fire suppression devices based on the outcome of the supervisory and management related tasks.

In various embodiments, said plurality of sensors is selected from the group consisting of break glass sensors, pull-down sensors, hose reel sensors, smoke detectors, fire detectors, sprinkler sensor, and heat detectors. In various embodiments, the fire detection system includes a diagnostic sensor mounted on a pipe connected to each of said fire suppression sensors respectively, and is configured to monitor the flow of water within the pipe, and generate an error signal if the flow of water is below a pre-defined threshold, detect the level of water flowing through the pipe, and generate said error signal if the level of water indicates empty of partially filled condition, detect the accumulation of debris in proximity of the sensor, and generate said error signal upon detection of debris, detect the temperature of water flowing through the pipe, and generate error signal when the temperature of water is low indicating risk of freezing, and detect the leakage of water from the pipe, and generate error signal if the leakage is detected.

In various embodiments, the software defined alarm control unit is configured to receive the error signal from the diagnostic sensor via the hard logic device, and is further configured to generate one or more notification signals to enable the hard logic device to actuate one or more said fire response devices, wherein the actuation of said fire response devices provide audio and/or visual notifications. In various embodiments, said fire suppression devices are selected from the group consisting of sprinklers, water hose reels, and fire extinguishers. In various embodiments, said software defined alarm control unit (SDACU) comprises a presentation layer to provide graphical user interface to display the present status of each zones, the plurality of sensors, the fire response devices, and the fire suppression devices, wherein the present status of each zones is defined based on at least one of said supervisory and management related tasks performed by the software defined alarm control unit, said notification signals, and said alert data, and a soft logic layer, implemented using one or more processor(s), is configured to perform the plurality of supervisory and management related tasks, and is further configured to operate one or more fire suppression devices and fire response devices based on the fire detection signal.

In various embodiments, the plurality of supervisory and management related tasks performed by the soft logic layer comprises detecting faulty or subpar performing sensors or devices by enabling the at least one of said sensors, said fire suppression devices, and said fire response devices to operate in a self-diagnosis mode, probing indicators associated with at least one of said sensors, said fire suppression devices, and said fire response devices, wherein the indicators correspond to the indication of either removal, tempering, or unauthorized usage of at least one of said sensors, said fire suppression devices, and said fire response devices, logging the current status of said sensors, said fire suppression devices, and said fire response devices periodically or upon detecting change in the status of at least one of said sensors, said fire suppression devices, and said fire response devices, periodically sending command signals at a pre-defined intervals of time to relay devices that are enabled to either actuate or de-actuate the fire suppression devices or fire response devices, re-defining the zones of at least one of said sensors, said fire suppression devices, and said fire response devices, establishing connection of the at least one of said sensors, said fire suppression devices, and said fire response devices with peer fire detection systems, and enrolling at least one additional sensors, additional fire suppression devices, and additional fire response devices in the system.

In various embodiments, the soft logic layer comprises a detection module, implemented using one or more processor(s), said detection module is configured to receive the fire detection signal from the hard logic device, and is further configured to identify the zone of the one or more sensors reporting said fire detection signal, identify the plurality of fire suppression devices and the plurality of fire response devices associated with the zone identified based on the received fire detection signal, and generate operating commands to actuate the fire suppression devices and fire response devices associated with the identified zone, via the hard logic device. In various embodiments, the plurality of fire response devices being operated based on the operating commands generated by the software defined alarm control unit are selected from the group consisting of shutters, doors, sirens, hooters, annunciators, HVAC fans and dampers. In various embodiments, the plurality of fire response devices being operated based on the generation of at least one notification signal are selected from the group consisting of sirens, hooters, display devices, and annunciators.

In various embodiments, the fire detection system includes a display console communicatively coupled with said software defined alarm control unit, wherein said display console is configured to display the present status of the fire detection system, wherein the present status includes the state of each of said zones, said plurality of fire suppression devices and said plurality of responsive devices. In various embodiments, the software defined alarm control unit is communicatively coupled to a cloud storage to facilitate supplementary monitoring, supervision, software provisioning, and firmware updates. In various embodiments, the software defined alarm control unit is configured to generate fire alert data by performing contextual based analysis on the received actuation signal.

Another implementation of the present disclosure is a method for detecting fire in one or more zones defined within a building, said method comprising the steps of receiving, by a hard logic device, at least one fire detection signal generated by a plurality of sensors, wherein said sensors are spatially distributed within each of the pre-defined zones and the fire detection signal comprises zone information indicating the zone in which the fire is detected, receiving, by a server having a software defined alarm control unit, the fire detection signal from the hard logic device, generating, by the server, one or more operating commands to selectively actuate one or more fire suppression devices and one or more fire response devices, and analyzing, by the server, the received fire detection signal to generate a fire alert data indicating the detection of fire.

In various embodiments, the method includes the steps of performing a plurality of supervisory and management related tasks, by the server, wherein the steps comprise detecting, faulty or subpar performing sensors and devices by enabling the at least one of said sensors, said fire suppression devices, and said fire response devices to operate in a self-diagnosis mode, probing, indicators associated with at least one of said sensors, said fire suppression devices, and said fire response devices, wherein the indicators correspond to the indication of either removal, tempering, or unauthorized usage of at least one of said sensors, said fire suppression devices, and said fire response devices, logging, the current status of said sensors, said fire suppression devices, and said fire response devices at a pre-defined interval of time or upon detecting change in the status of at least one of said sensors, said fire suppression devices, and said fire response devices, periodically sending command signals at a pre-defined intervals of time to relay devices that are enabled to either switch on or off the fire suppression devices or fire response devices, re-defining the zones of at least one of said sensors, said fire suppression devices, and said fire response devices, establishing connection of the at least one of said sensors, said fire suppression devices, and said fire response devices of said system with at least one peer fire detection system, enrolling at least one additional sensors, an additional fire suppression devices, and an additional fire response devices in the system, and displaying the present status of each of said zones, said plurality of sensors, said fire response devices, and said fire suppression devices based on the outcome of the supervisory and management related tasks.

In various embodiments, said plurality of sensors is selected from the group consisting of break glass sensors, pull-down sensors, hose reel sensors, smoke detectors, fire detectors, sprinkler sensor, and heat detectors. In various embodiments, the fire suppression devices being operated by the software defined alarm control unit corresponds to the fire suppression devices deployed in the zone from which fire is detected by the one or more sensors.

Another implementation of the present disclosure is a fire panel for a fire detection system of a building having a plurality of zones defined therewithin, wherein each of said zones is associated with a plurality of input devices, a plurality of fire suppression devices, and a plurality of fire response devices, said fire panel comprising a software defined alarm control unit (SDACU), implemented using one or more processor(s), configured to perform a plurality of supervisory and management related tasks, and is further configured to generate an operating command to selectively operate one or more of said fire suppression devices and said fire response devices based on a fire detection signal generated by at least one of said input devices, generate a notification signal to operate one or more of said fire response devise based on an error signal generated by at least one of said input devices, and generate an alert data based on at least one of or combination of said fire detection signal and error signal, a hard logic device communicatively coupled with said software defined alarm control unit, the plurality of input devices, the plurality of fire suppression devices and the plurality of fire response devices, wherein the hard logic is configured to facilitate communication of the software defined alarm control unit with the plurality of input devices, the plurality of fire suppression devices and the plurality of fire response device.

In various embodiments, the hard logic device comprises an initiating device circuit configured to facilitate communication between the input devices and the software defined alarm control unit, said initiating device circuit is configured to enable reception of one or more fire detection signals generated by the input devices, wherein the input devices are selected from the group consisting of break glass sensors, pull-down sensors, hose reel sensors, smoke detectors, fire detectors, sprinkler sensor, and heat detectors, enable reception of one or more error signals generated by the input devices, wherein the input device is a diagnostic sensor mounted on a pipe connected to each of the fire suppression sensors, and a notification appliance circuit configured to facilitate connection of the software defined alarm control unit with the plurality of fire suppression devices and the plurality of fire response devices, said notification appliance circuit is further configured to enable the transmission of one or more operating commands to at least one of or combination of fire suppression devices and fire response devices.

In various embodiments, the hard logic device includes a power supply unit configured to draw power from the mains supply, and is further configured to supply power to the software defined alarm control unit, and an auxiliary power supply unit having at least one battery configured to supply power to the software defined alarm control unit in an event when the power supplied by the power supply unit is nil. In various embodiments, the software defined alarm control unit is configured to transmit the alert data to one or more remote servers associated with at least one emergency response team, wherein the alert data is transmitted by the software defined alarm control unit via a city circuit housed within the hard logic device. In various embodiments, the plurality of supervisory and management related tasks performed by the software defined alarm control unit are detecting faulty or subpar performing devices by enabling the at least one of said input devices, said fire suppression devices, and said fire response devices to operate in a self-diagnosis mode, probing indicators associated with at least one of said input devices, said fire suppression devices, and said fire response devices, wherein the indicators correspond to the indication of either removal, tempering, or unauthorized usage of at least one of said input devices, said fire suppression devices, and said fire response devices, logging the current status of said input devices, said fire suppression devices, and said fire response devices at a pre-defined interval of time or upon detecting change in the status of at least one of said input devices, said fire suppression devices, and said fire response devices, periodically sending command signals at pre-defined intervals of time to relay devices that are enabled to switch either on or off the fire suppression devices or fire response devices, re-defining the zones of at least one of said input devices, said fire suppression devices, and said fire response devices, disabling or enabling, the function or state of said input devices, said fire suppression devices, and said fire response devices, wherein the state corresponds to enabled state or disabled state, establishing connection of the at least one of said input devices, said fire suppression devices, and said fire response devices of said system with peer fire detection systems, enrolling at least one of an additional input device, an additional fire suppression device, and an additional fire response device in the system, and generating operating commands or notification signals to actuate at least one of or combination of the fire suppression devices and fire response devices associated with the identified zone, via the hard logic device.

In various embodiments, the hard logic device is configured to be connected with a communication interface to facilitate a user to provide user-defined commands, wherein the user-defined command provided by the user correspond to rules for performing supervisory and management related tasks.

Another implementation of the present disclosure is a computer implemented fire risk assessment system comprising a plurality of fire detection units, implemented using one or more processor(s), wherein each of the fire detection unit is associated with a building, and is configured to generate a fire alert data having a building identifier and an event type data, and a server configured to receive at least one fire alert data from one or more of said fire detection units, said server comprising a repository configured to store a lookup table having a list of building identifiers, and a location coordinate corresponding to each of the building identifier, and a processing circuit, implemented using one or more processor(s), configured to cooperate with the repository, and is further configured to identify the location of the building based on the building identifier contained within the fire alert data, contextually analyze the fire alert data with any one of or combination of the identified location of building and event type data based on a plurality of pre-defined risk assessment parameters to generate a risk score corresponding to each of the risk assessment parameters, aggregate the risk score of each of the risk assessment parameters to generate an aggregated risk score, normalize the aggregated risk score to generate a normalized risk score, and determine a contextual risk score by evaluating the normalized risk score with historical data, and subsequently classify the received fire alert data as any one of a low risk event, a moderate risk event, and a high risk event.

In various embodiments, the risk assessment parameters are selected from the group consisting of social media feeds, event type, life safety impact, local time and date, and business value. In various embodiments, the server is communicatively coupled with a display console which is configured to display the contextual risk score. In various embodiments, the contextual risk score is time stamped and stored in the repository and in a historical database by the processing circuit. In various embodiments, the processing circuit is configured to periodically perform the contextual analysis on the pre-defined risk assessment parameters to re-calculate the risk score for each of the pre-defined risk assessment parameters and thereby update the contextual risk score. In various embodiments, the processing circuit is configured to classify the received fire alert data as low risk event if the contextual risk score is below a first pre-defined risk score, moderate risk event if the contextual risk score is above a first pre-defined risk score and below a second pre-defined risk score, and high risk event if the contextual risk score is above the second pre-defined risk score, wherein the first pre-defined risk score and the second pre-defined risk score is stored in the repository of the server.

In various embodiments, said processing circuit is configured to crawl through the lookup table to identify the received building identifier and extract the location coordinates corresponding to the identified building identifier, wherein the extracted location coordinates corresponds to the location of the building reporting fire alert data.

Another implementation of the present disclosure is a method for performing fire risk assessment comprises the steps of receiving, by a server, a fire alert data from a fire detection unit, wherein the fire detection unit is associated with a building and the fire alert data comprises a building identifier and an event type data, identifying, by the server, the location of the building based on the building identifier contained within the fire alert data, contextually analyzing, by the server, the fire alert data with any one of or combination of the identified location of building and event type data based on a plurality of pre-defined risk assessment parameters to generate a risk score corresponding to each of the risk assessment parameter, generating by the server, an aggregated risk score by aggregating the risk score corresponding to each of the risk assessment parameter, generating by the server, a normalized risk score by normalizing the aggregated risk score, and determining by the server, a contextual risk score by analyzing the normalized risk score with historical data to classify the received fire alert data as a low risk event, a moderate risk event, or a high risk event.

In various embodiments, the step of identifying the location of the building comprises the following sub-steps of crawling through a lookup table having a list of building identifiers, and extracting a location coordinate corresponding to the received building identifier from the lookup table, wherein the lookup table having a list of building identifiers and a location coordinate corresponding to each of the building identifier is stored in a repository of the server. In various embodiments, the method includes the step of displaying the contextual risk score on a display console communicatively coupled to the server. In various embodiments, the step of classifying the received fire alert data as a low risk event, a moderate risk event, or a high risk event include the steps of comparing the contextual risk score with pre-defined risk scores, wherein the pre-defined risk scores include a first pre-defined risk score and a second pre-defined risk score stored in the repository of the server, determining a low risk event when the contextual risk score is less than or equal to the first pre-defined risk score, determining a medium risk event when the contextual risk score is in between the first pre-defined risk score and the second pre-defined risk score, and determining a high risk event when the contextual risk score is greater than or equal to the second pre-defined risk score.

In various embodiments, the method includes the step of periodically performing the contextual analysis to re-calculate the risk score for each of the predefined risk assessment parameters and thereby update the contextual risk score.

Another implementation of the present disclosure is a system for performing contextual based risk assessment, said system comprising a repository configured to store a lookup table having a list of building identifiers, and a location coordinate corresponding to each of the building identifier, a historical database configured to store historical risk score pertaining to each of the buildings, and a processing circuit, implemented using one or more processor(s), configured to cooperate with the repository and the historical database, and further configured to receive one or more fire alert data having a building identifier and an event type data from a fire detection unit, said processing circuit comprising a social media feed analyzer configured to determine a first risk score by performing social media feed analysis, an event type analyzer configured to determine a second risk score by performing event type data analysis, a life safety impact analyzer configured to determine a third risk score by identifying the presence of people in the vicinity of the building, a time and date analyzer configured to determine a fourth risk score by identifying the time and date of receiving the fire alert data, a business value analyzer configured to determine a fifth risk score by identifying the value of assets under threat, an aggregator configured to cooperate with the social media feed analyzer, the event type analyzer, the life safety impact analyzer, the time and date analyzer, and the business value analyzer to receive and aggregate the first, second, third, fourth and fifth risk scores to generate an aggregated risk score, a data normalizer configured to cooperate with the aggregator to receive the aggregated risk score, and further configured to normalize the aggregated risk score to generate a normalized risk score, and a risk score generator configured to cooperate with the data normalizer to determine contextual risk score by analyzing the normalized risk score with historical data, and further configured to classify the received fire alert data as any one of a low risk event, a moderate risk event, and a high risk event.

In various embodiments, said social media feed analyzer is configured to determine a first risk score by performing social media feed analysis to identify the sources of risk in proximity of the location of the building reporting fire alert data, wherein the value of said first risk score is directly proportional to the number of identified sources of risk, said event type analyzer is configured to determine a second risk score by performing event type data analysis, wherein the second risk score is based on the type of said event, said life safety impact analyzer is configured to determine a third risk score by identifying the presence of people in the vicinity of the building, wherein the value of said third risk score is directly proportional to human density in the vicinity of the building, said time and date analyzer is configured to determine a fourth risk score by identifying the time and date of receiving the fire alert data, wherein the value of the fourth risk score is higher for the time and date when human density is expected to be at peak, and said business value analyzer is configured to determine a fifth risk score by identifying the value of assets under threat, wherein the value of fifth risk score is directly proportional to the value of assets under threat.

In various embodiments, the repository is configured to store a pre-defined first risk score and a pre-defined second risk score. In various embodiments, the risk score generator is configured to receive the normalized risk score from the data normalizer, and the first and the second pre-defined risk scores from the repository, said risk score generator is configured to determine the contextual risk score by analyzing the normalized risk score with historical data received from the historical database, and is further configured to compare the contextual risk score with the first and second pre-defined risk score to classify the received fire alert data as any one of low risk event, moderate risk event, and high risk event. In various embodiments, the risk score generator is configured to classify the received fire alert data as low risk event when the contextual risk score is below the first pre-defined risk score, classify the received fire alert data as moderate risk event when the contextual risk score is between the first pre-defined risk score and the second pre-defined risk score, and classify the received fire alert data as high risk event when the contextual risk score is greater than the second pre-defined risk score.

In various embodiments, the risk score generator is configured to store the contextual risk score in the repository, and is further communicatively coupled to a display console to display the determined contextual risk score along with the classification of the fire alert data as any one of said low risk event, said moderate risk event, and said high risk event. In various embodiments, the display console is communicatively coupled with the processing circuit by means of an application programming interface (API). In various embodiments, the processing circuit is configured to periodically perform contextual analysis and generate an updated risk scores, and subsequently update contextual risk score and the risk classification.

Another implementation of the present disclosure is a method for performing contextual based risk assessment, said method comprising the steps of receiving by a processing circuit implemented using one or more processor(s), one or more fire alert data having a building identifier and an event type data from a fire detection unit, performing contextual analysis, by the processing circuit, on the received fire alert data based on any one of or combination of the identified location of building and an event type data to generate a plurality of risk scores, wherein the location coordinates of each building corresponds to a building identifier is stored in a repository, aggregating by the processing circuit, the risk score corresponding to each of the risk assessment parameter to generate an aggregated risk score, normalizing by the processing circuit, the aggregated risk score to generate a normalized risk score, determining by the processing circuit, contextual risk score by analyzing the normalized risk score with historical data, wherein the historical data is stored in the repository, and classifying by the processing circuit, the received fire alert data as one of a low risk event, a moderate risk event, and a high risk event is based on the value of the contextual risk score.

In various embodiments, the step of performing contextual analysis, by the processing circuit, based on any one of or combination of the location of building and event type data to generate the plurality of risk scores is performed by the following steps of determining a first risk score by performing social media feed analysis to identify the sources of risk in proximity of the location of the building reporting fire alert data, wherein the value of said first risk score is directly proportional to the number of identified sources of risk, determining a second risk score by performing event type data analysis, wherein the second risk score is based on the type of said event, determining a third risk score by identifying the presence of people in the vicinity of the building, wherein the value of said third risk score is directly proportional to human density in the vicinity of the building, determining a fourth risk score by identifying the time and date of receiving the fire alert data, wherein the value of the fourth risk score is higher for the time and date when human density is expected to be at peak, and determining, a fifth risk score by identifying the value of assets under threat, wherein the value of the fifth risk score is directly proportional to the value of assets under threat.

In various embodiments, the repository is configured to store a first pre-defined risk score and a second pre-defined risk score, and wherein the step of classifying, the received fire alert data as one of the low risk event, the moderate risk event, and the high risk event based on the value of the contextual risk score is performed by the steps of receiving the first and second pre-defined risk score from the repository, comparing the contextual risk score with the first and second pre-defined risk scores, classifying the received fire alert data as low risk event when the contextual risk score is below a first pre-defined risk score, classifying the received fire alert data as moderate risk event when the contextual risk score is between the first pre-defined risk score and a second pre-defined risk score, and classifying the received fire alert data as high risk event when the contextual risk score is greater than the second pre-defined risk score.

In various embodiments, the step of displaying the determined contextual risk score along with the classification of the fire alert data as any one of a low risk event, a moderate risk event, and a high risk event on a dashboard of a display console.

Another implementation of the present disclosure is a fire detection and risk assessment system for a building having a plurality of input devices, a plurality of fire suppression devices, and a plurality of fire response devices, wherein each of the plurality of input devices is configured to generate at one of a fire detection signal and an error signal, said system comprising a fire panel having a hard logic device communicatively coupled with the plurality of input devices, the plurality of fire response devices, and a plurality of fire suppression devices, and a software defined alarm control unit (SDACU), implemented using a virtual server, said software defined alarm control unit is configured to perform a plurality of supervisory and management related tasks, and subsequent to reception of at least one fire detection signal via the hard logic device, the SDACU is configured to generate an operating command to selectively operate one or more of said fire suppression devices and fire response devices in actuated state, generate an alert data indicating the detection of fire, wherein the fire alert data comprises a building identifier and an event type data, generate a notification signal to selectively operate one or more of said fire response devices based on the error signals generated by at least one of said input devices, and a risk assessment unit, implemented using a remote server, communicatively coupled to the fire panel, and comprises a repository configured to store a lookup table having a list of building identifiers, and a location coordinate corresponding to each of the building identifiers, a processing circuit, implemented using one or more processor(s), configured to cooperate with the repository, and is further configured to identify the location of the building based on the building identifier contained within the fire alert data, contextually analyze the fire alert data with any one of or combination of the identified location of building and event type data based on a plurality of pre-defined risk assessment parameters to generate a risk score corresponding to each of the risk assessment parameters, aggregate the risk score of each of the risk assessment parameters to generate an aggregated risk score, normalize the aggregated risk score to generate a normalized risk score, and determine a contextual risk score by evaluating the normalized risk score with historical data, and subsequently classify the received fire alert data as a low risk event, a moderate risk event, or a high risk event.

In various embodiments, the software defined alarm control unit includes a presentation layer configured to provide a graphical user interface to display the present status of each zones, the plurality of sensors, the fire response devices, and the fire suppression devices, wherein the present status of each zones is defined based on at least one of said supervisory and management related tasks performed by the software defined alarm control unit, said notification signals, and said alert data. In various embodiments, the hard logic device comprises an initiating device circuit configured to facilitate communication between the input devices and the software defined alarm control unit, said initiating device circuit is configured to enable the reception of one or more fire detection signals generated by the input devices, wherein the input devices are selected from the group consisting of break glass sensors, pull-down sensors, hose reel sensors, smoke detectors, fire detectors, sprinkler sensor, and heat detectors, and enable the reception of one or more error signals from the input devices, wherein the input device includes one or more diagnostic sensors mounted on a pipe connected to one or more of the fire suppression sensors, and a notification appliance circuit configured to facilitate the communication of said software defined alarm control unit with the plurality of fire suppression devices and the plurality of fire response devices, said notification appliance circuit is further configured to enable the transmission of one or more operating commands to actuate one or more of said fire suppression devices and fire response devices, and enable the transmission of one or more notification signals to actuate at least one of said plurality of response devices.

In various embodiments, said diagnostic sensor is configured to monitor the flow of water within the pipe, and generate the error signal if the flow of water is below a pre-defined threshold, monitor the level of water flowing through the pipe, and generate the error signal if the level of water indicates empty of partially filled condition, detect accumulation of debris in proximity of the sensor, and generate the error signal upon detection of debris, monitor the temperature of water flowing through the pipe; and generate control signal when the temperature of water is low indicating risk of freezing, and detect the leakage of water from the pipe, and generate the error signal if the leakage is detected. In various embodiments, the software defined alarm control unit (SDACU) comprises a soft logic layer configured to perform the plurality of supervisory and management related tasks, and is further configured to operate one or more fire suppression devices and fire response devices based on the fire detection signal, and one or more of said fire response devices based on the error signal.

In various embodiments, the plurality of supervisory and management related tasks performed by the software defined alarm control unit (SDACU) comprises detecting faulty or subpar performing devices by enabling the at least one of said input devices, said fire suppression devices, and said fire response devices to operate in a self-diagnosis mode, probing indicators associated with said devices, wherein the indicators correspond to the indication of either removal, tempering, or unauthorized usage of at least one of said input devices, said fire suppression devices, and said fire response devices, logging the current status of said devices at a pre-defined interval of time or upon detecting change in the status of at least one of said input devices, said fire suppression devices, and said fire response devices, periodically sending command signals to relay devices that are enabled to switch either actuate or de-actuate the fire suppression devices or fire response devices, re-defining the zones of at least one of said input devices, said fire suppression devices, and said fire response devices, establishing connection of the at least one of said input devices, said fire suppression devices, and said fire response devices said system with peer fire detection systems, and enrolling at least one additional sensors, fire suppression devices, and fire response devices in the system.

In various embodiments, the processing circuit is configured to crawl through the lookup table to identify the received building identifier and extract the location coordinates corresponding to the identified building identifier, wherein the extracted location coordinates corresponds to the location of the building reporting said fire alert data. In various embodiments, the risk assessment parameters are selected from the group consisting of social media feed, event type, life safety impact, local time and date, and business value. In various embodiments, the risk assessment unit is communicatively coupled with a display console which is configured to display the contextual risk score. In various embodiments, the processing circuit is configured to periodically perform the contextual analysis on the pre-defined risk assessment parameters to re-calculate the risk score for each of the pre-defined risk assessment parameters and thereby update the contextual risk score. In various embodiments, the processing circuit is configured to classify the received fire alert data as a low risk event if the contextual risk score is below a first pre-defined risk score, a moderate risk event if the contextual risk score is above a first pre-defined risk score and below a second pre-defined risk score, and a high risk event if the contextual risk score is above the second pre-defined risk score, wherein the first pre-defined risk score and the second pre-defined risk score is stored in the repository of the server.

In various embodiments, the soft logic layer comprises a detection module, implemented using one or more processor(s), said detection module is configured to receive the fire detection signal from the hard logic device, and is further configured to identify the zone of the one or more sensors reporting said fire detection signal, identify the plurality of fire suppression devices and the plurality of fire response devices associated with the zone identified based on the received fire detection signal, and generate operating commands or notification signals to actuate any one of or combination of the fire suppression devices and fire response devices associated with the identified zone, via the hard logic device.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Before turning to the Figures, it should be understood that the disclosure is not limited to the details or methodology set forth in the description or illustrated in the figures. It should also be understood that the terminology is for the purpose of description only and should not be regarded as limiting.

Referring generally to the FIGURES, a software defined fire detection system and a fire risk assessment system is described. The fire detection system of the present disclosure employs a fire panel having a software defined alarm control unit (SDACU) and a low power hard logic device. The fire detection system of the present disclosure is more centralized, flexible, cost-effective, and fault-tolerant solution. The SDACU solution replaces existing fire panels with a server that includes software architecture supporting a soft logic layer and a presentation layer. The solution also includes a low powered hardware device that maintains any of the functions of a traditional fire panel that cannot be virtualized (hard logic and IO). In the context of this invention, an example of an application of the hard logic layer is the control of sounders and alarms linked to fire detection events. An example of an application the soft logic layer is a complex event process that alerts specific personnel based on the contextual information surrounding a fire detection event.

Building Management System and Fire System

Figure 1:
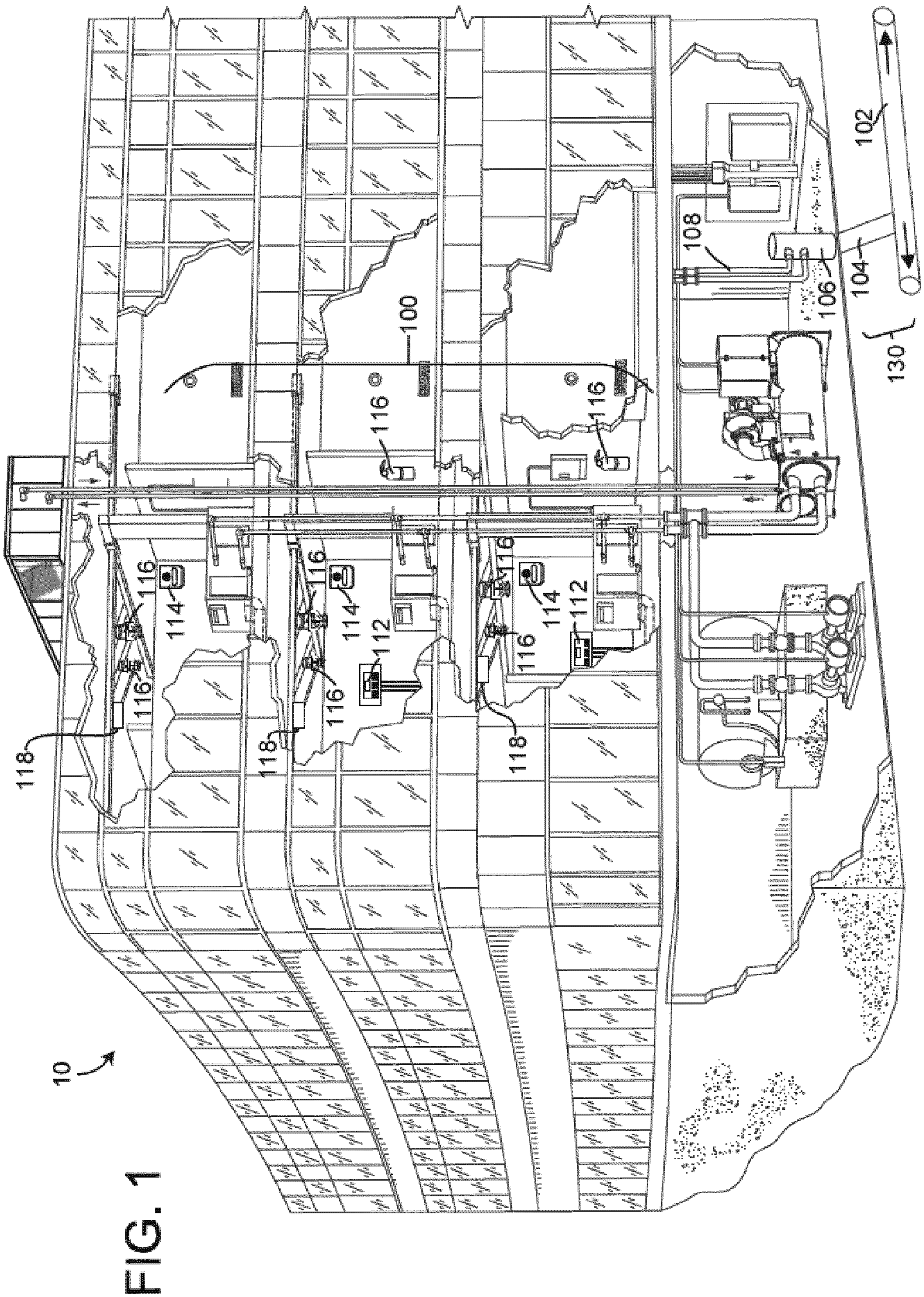
FIG. 1 illustrates a drawing of a building equipped with a building management system (BMS) and a fire system, according to some embodiments.
Figure 2:
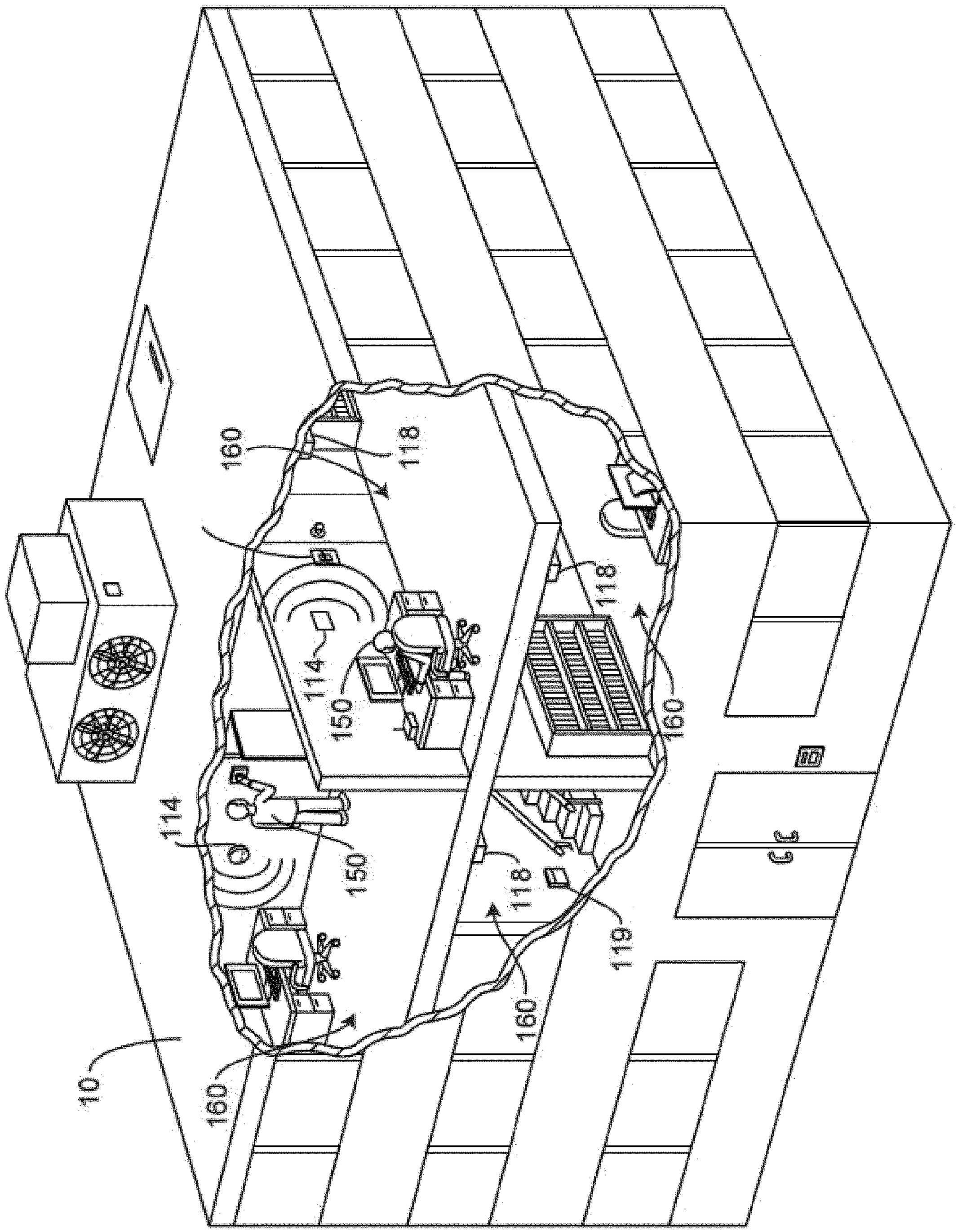
FIG. 2 illustrates a perspective view of the building of FIG. 1, including rooms, occupants, fire notification devices, fire suppression devices, and fire detection devices of the fire system, according to some embodiments.

Referring now to FIGS. 1-4, a building management system (BMS) and fire suppression system are shown, according to some embodiments. Referring particularly to FIG. 1, a perspective view of a building 10 is shown. Building 10 is served by a building management system (BMS), according to some embodiments. A BMS is, in general, a system of devices configured to control, monitor, and manage equipment in or around a building or building area, according to some embodiments. A BMS can include, for example, a fire suppression system, a security system, a lighting system, a fire detection system, any other system that is capable of managing building functions or devices, or any combination thereof.

The BMS that serves building 10 includes a fire system 100 (e.g., a fire detection and/or fire suppression system), according to some embodiments. Fire system 100 can include fire safety devices (e.g., notification devices such as fire detectors and pull stations, sprinklers, fire alarm control panels, fire extinguishers, water systems etc.) configured to provide fire detection, fire suppression, fire notification to building occupants 150, or other fire suppression-related services for building 10. Fire system 100 includes water system 130, according to some embodiments. Water system 130 provides water from a city line 102 through a building line 104 to building 10 to suppress fires within one or more rooms/spaces of building 10, according to some embodiments. In some embodiments, a main water line 106 is the dominant piping system that distributes water throughout one or more of the building floors in building 10. The water is distributed to the one or more building floors of building 10 via a piping system 108, according to some embodiments.

Referring still to FIGS. 1-4, fire system 100 can also include fire detection devices 118, fire notification devices 114, and fire suppression devices 116 positioned in various rooms/spaces 160 of building 10. Fire suppression devices 116 may include sprinklers, fire extinguishers, etc., or any other device configured to suppress a fire. Fire suppression devices 116 may be positioned in various rooms 160 of building 10. Fire suppression devices 116 may be connected to piping system 108 and serve as one of the corrective actions taken by fire system 100 to suppress fires. In some embodiments, fire suppression devices 116 can engage in suppressive action using dry agents (nitrogen, foam, non-fluorinated foam, air, etc.) instead of water. One or more of the fire suppression devices may be a portable device capable of discharging a fire suppressing agent (e.g., water, foam, gas, etc.) onto a fire. Building 10 may include fire extinguishers (e.g., portable fire suppression devices) on several floors in multiple rooms 160. Fire system 100 can also include one or more pull stations 119 configured to receive a manual input from an occupant 150 of building 10 to indicate the presence of a fire. Pull stations 119 may include a lever, a button, etc., configured to receive a user input indicating that a fire has occurred in building 10. In some embodiments, pull stations 119 are configured to provide a signal to fire alarm control panel 112 regarding a status of the lever, button, etc. When an occupant 150 pulls the lever or pushes the button (or more generally inputs to any of pull stations 119 that there is an emergency situation in building 10), pull stations 119 provide fire alarm control panel 112 with an indication that an occupant 150 of building 10 has actuated one of the pull stations 119. In some embodiments, the indication includes an identification of the particular pull station 119 that has been actuated and a location of the particular pull station 119 (e.g., what floor the fire is at, what room the fire is in, etc.).

Fire notification devices 114 can be any devices capable of relaying audible, visible, or other stimuli to alert building occupants of a fire or other emergency condition. In some embodiments, fire notification devices 114 are powered by Initiating Device Notification Alarm Circuit (IDNAC) power from fire alarm control panel 112. In some embodiments, fire notification devices 114 may be powered by a DC power source (e.g. a battery). In some embodiments, fire notification devices 114 are powered by an external AC power source. Fire notification devices 114 can include a light notification device (e.g., a visual alert device) and a sound notification device (e.g., an aural alert device). The light notification device can be implemented as any component in fire notification devices 114 that alerts occupants 150 of an emergency by emitting visible signals. In some embodiments, fire notification devices 114 include a strobe light configured to emit strobe flashes (e.g., at least 60 flashes per minute) to alert occupants 150 of building 10 of an emergency situation or regarding the presence of a fire 180. A sound notification device can be any component in fire notification devices 114 that alerts occupants of an emergency by providing an aural alert/alarm. In some embodiments, fire notification devices 114 emit signals ranging from approximately 500 Hz (low frequency) to approximately 3 kHz (high frequency).

Fire alarm control panel 112 can be any computer capable of collecting and analyzing data from the fire notification system (e.g., building controllers, conventional panels, addressable panels, etc.). In some embodiments, fire alarm control panel 112 is directly connected to fire notification device 114 through IDNAC power. In some embodiments, fire alarm control panel 112 can be communicably connected to a network for furthering the fire suppression process, including initiating corrective action in response to detection of a fire.

In some embodiments, fire detection devices 118 are configured to detect a presence of fire in an associated room 160. Fire detection devices 118 may include any temperature sensors, light sensors, smoke detectors, etc., or any other sensors/detectors that detect fire. In some embodiments, fire detection devices 118 provide any of the sensed information to fire alarm control panel 112.

Figure 3:
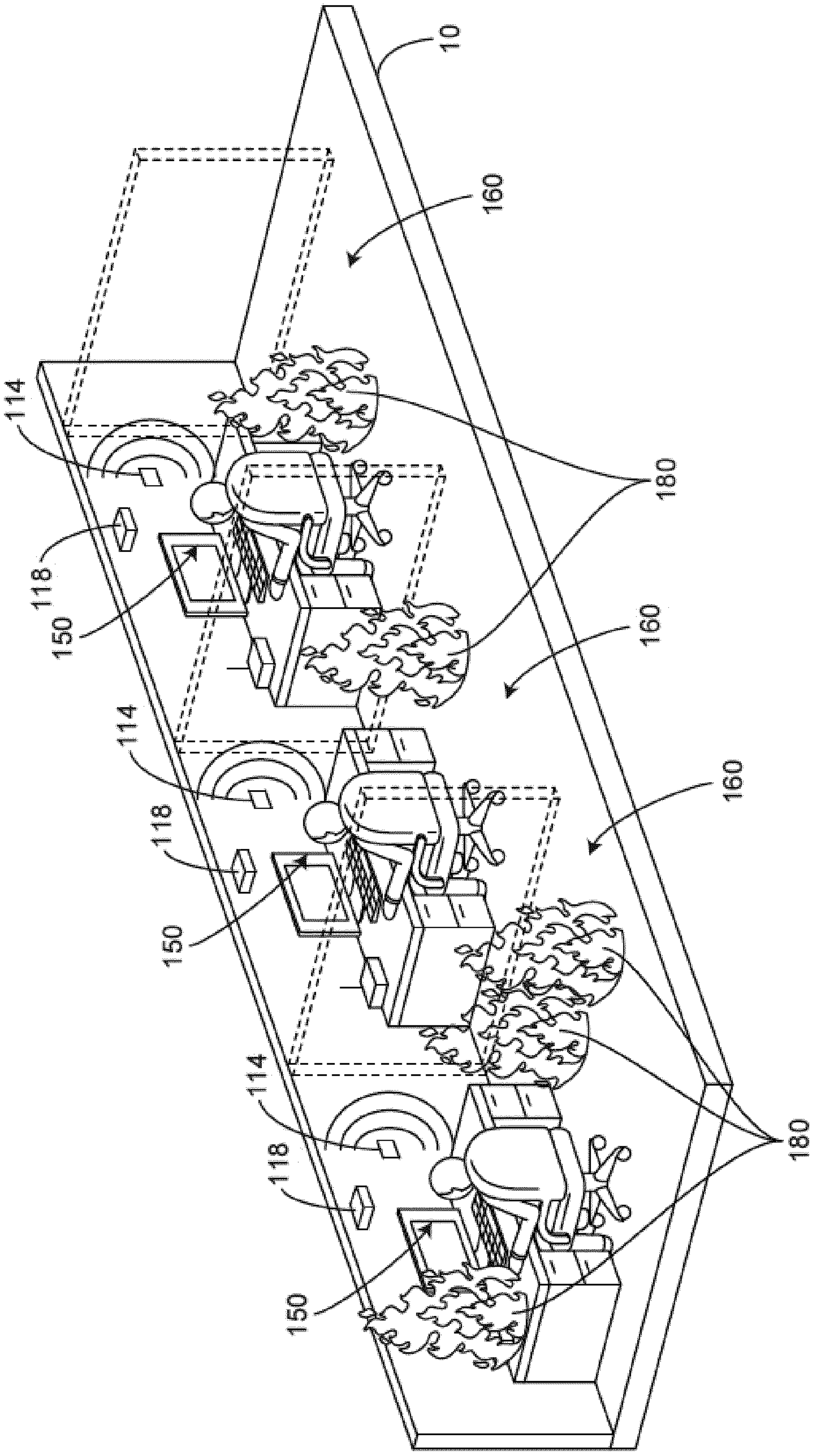
FIG. 3 illustrates a perspective view of various rooms of the building of FIG. 1, including occupants, notification devices, and fire detection devices of the fire system, according to some embodiments.

Referring particularly to FIG. 3, a perspective view of various rooms of building 10 is shown, according to some embodiments. In some embodiments, fire detection devices 118 are configured to monitor any of a temperature, a light intensity, a presence of smoke, etc., of a corresponding room/space 160 of building 10. Fire detection devices 118 can be configured to locally perform a fire detection process to determine if a fire 180 is present in room/space 160 based on the sensed data (e.g., the sensed room temperature, the sensed light intensity in room 160, the sensed smoke in room 160, etc.), according to some embodiments. In some embodiments, fire detection devices 118 provide any of the sensed information (e.g., the room temperature of room 160, the light intensity within room 160, the presence of smoke within room 160, etc.) to fire alarm control panel 112. Fire alarm control panel 112 is configured to receive any of the sensor information from any of fire detection devices 118 throughout building 10 and perform a fire detection process to determine if a fire 180 is present in any rooms/spaces 160 of building 10, according to some embodiments. In some embodiments, fire alarm control panel 112 is configured to cause fire notification devices 114 to provide any of a visual and/or an aural alert to occupants 150 in response to determining that a fire 180 is present in one of rooms 160 of building 10. In some embodiments, fire alarm control panel 112 is configured to cause a specific fire notification device 114 to provide an alarm/alert to an occupant 150 of a particular room/space 160 in response to determining that a fire 180 is present in the particular room/space 160 of building 10.

In some embodiments, fire alarm control panel 112 is configured to provide a BMS controller 366 (see FIG. 4) with a status of any of fire notification devices 114 and/or any of the collected information/data from fire detection devices 118. For example, fire alarm control panel 112 may provide BMS controller 366 with an indication of a current status (e.g., normal mode, alarm mode, etc.) of any of fire notification devices 114. In some embodiments, fire alarm control panel 112 is configured to cause one or more of fire suppression device 116 to suppress the fire in response to determining that a fire is present in building 10. In some embodiments, fire alarm control panel 112 is configured to cause a particular fire suppression device 116 to suppress a fire in a particular room/space 160 in response to determining that a fire 180 is present in the particular room/space 160. In some embodiments, fire alarm control panel 112 is configured to provide BMS controller 366 with a status (e.g., activated, dormant, etc.) of any or all of fire suppression devices 116.

Fire Detection System

Figure 4:
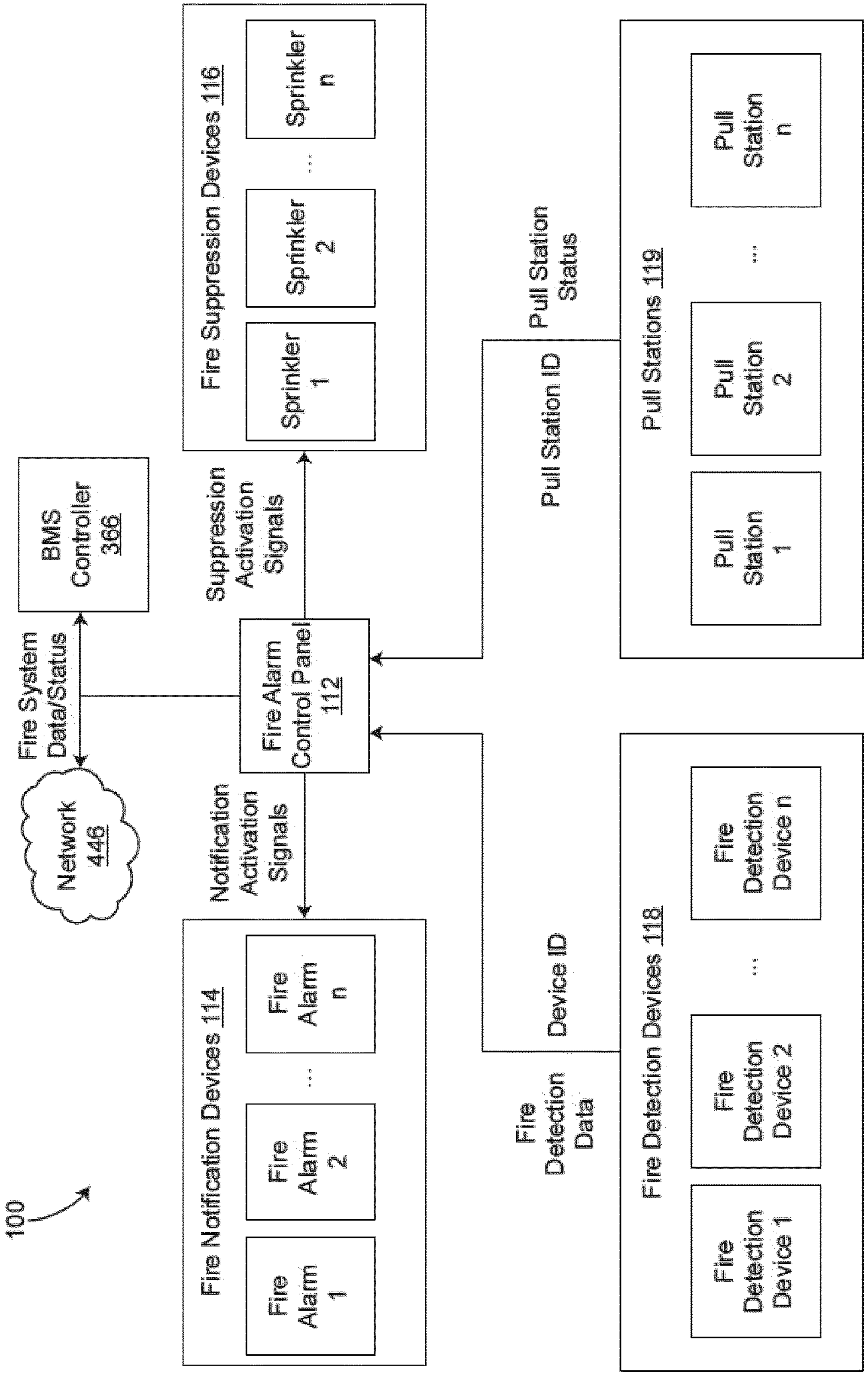
FIG. 4 illustrates a block diagram of the fire system of FIG. 1, according to some embodiments.
Figure 5:
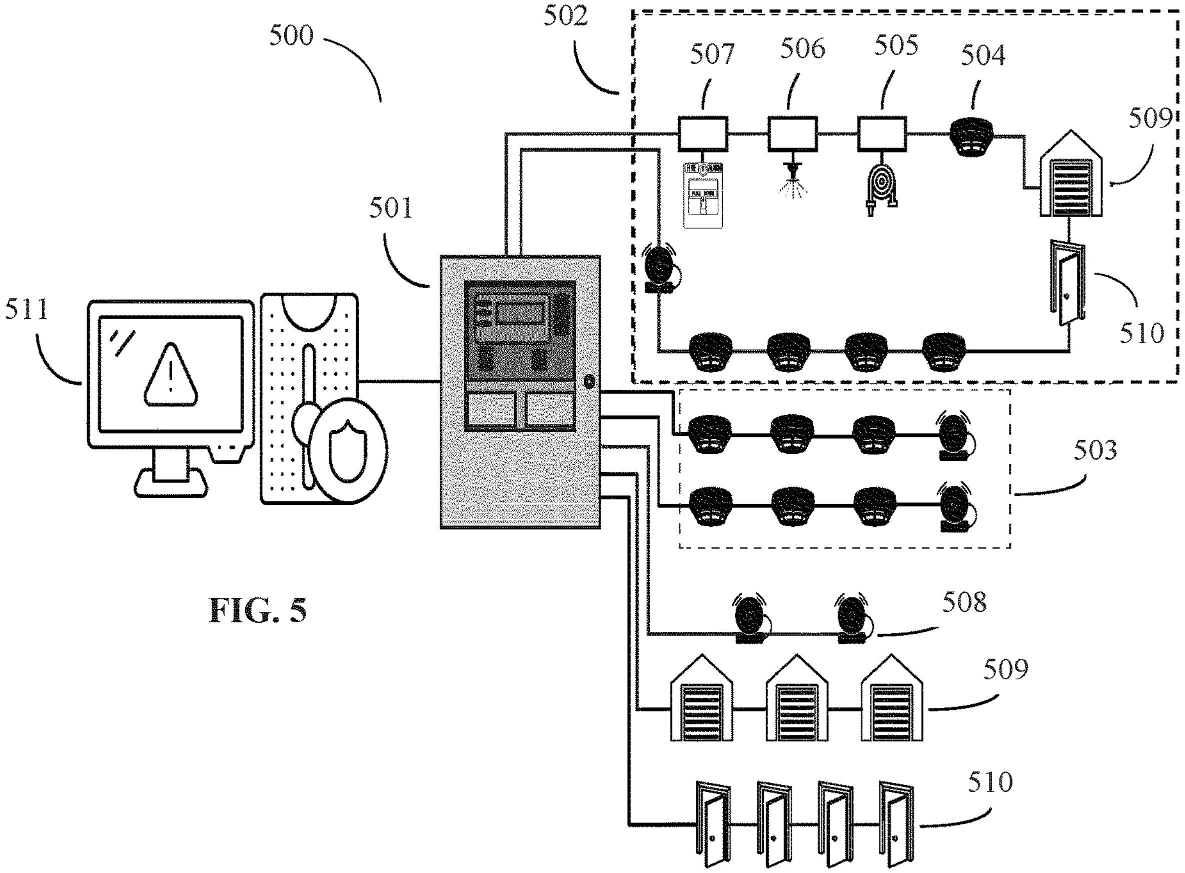
FIG. 5 illustrates a block diagram of a conventional fire detection system.
Figure 6:
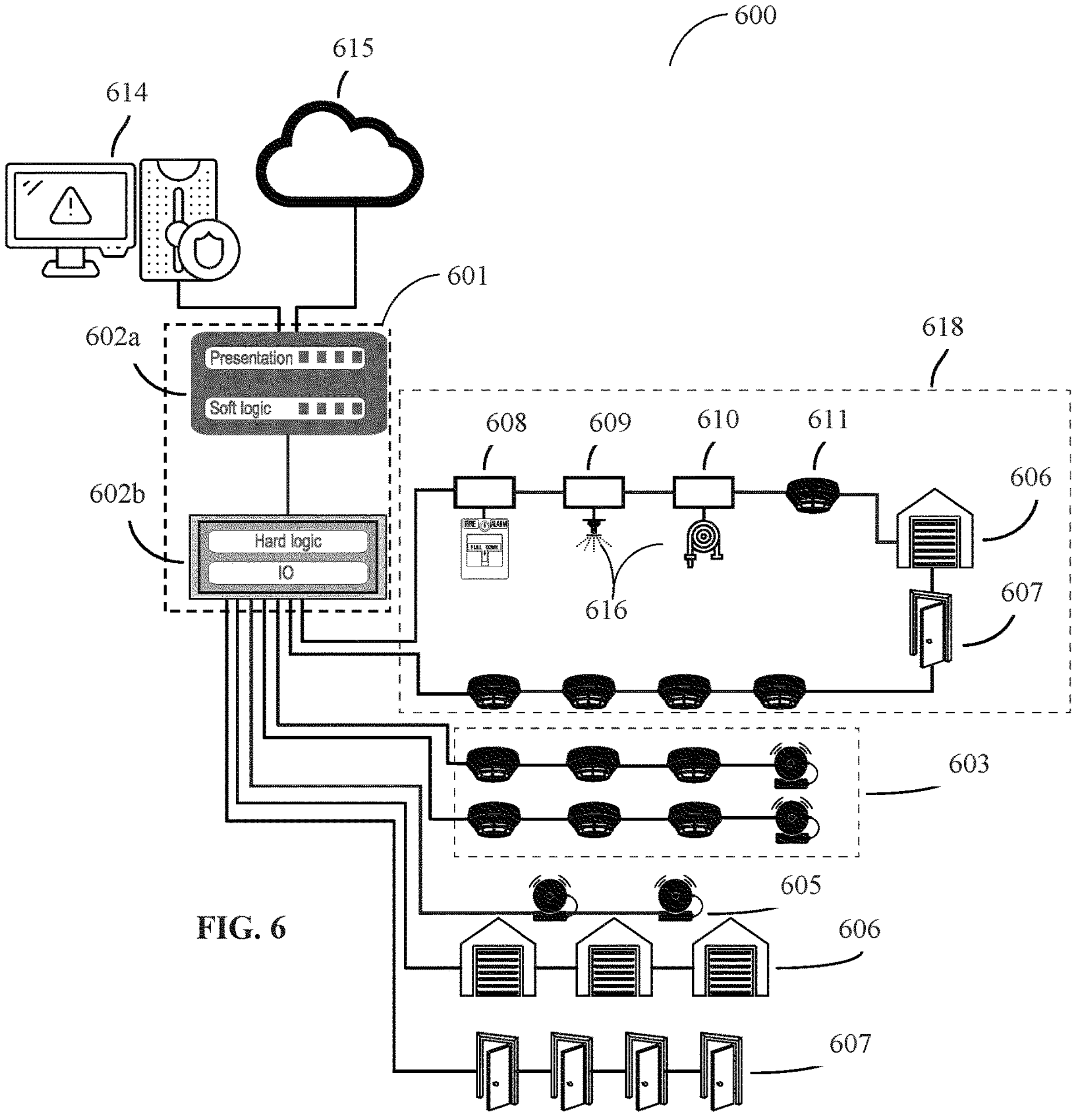
FIG. 6 illustrates a block diagram of a software defined fire detection system, in accordance with some embodiments of the present disclosure.

Referring particularly to FIG. 4, fire system 100 is shown in greater detail, according to some embodiments. As shown, fire alarm control panel 112 can be configured to receive any fire detection data (e.g., smoke detection, heat/temperature detection, light intensity detection, etc.) from any of fire detection devices 118. In some embodiments, fire alarm control panel 112 also receives a unique device ID (e.g., an identification number, an identification code, etc.) from each of fire detection devices 118. In some embodiments, fire alarm control panel 112 is configured to determine a location in building 10 of each of fire detection device 118 based on the unique device ID received from each of fire detection devices 118. For example, fire alarm control panel 112 can determine that a particular fire detection device 118 is located in a certain room, on a certain floor of building 10.

In some embodiments, fire alarm control panel 112 also receives pull station status information from any of pull stations 119 throughout building 10. In some embodiments, fire alarm control panel 112 is configured to receive a unique pull station ID (e.g., an identification number, an identification name, a unique ID code, etc.) from each of pull stations 119. In some embodiments, fire alarm control panel 112 is configured to perform a fire detection process based on any of the pull station status information received from pull stations 119 and the fire detection data received from fire detection devices 118. Fire alarm control panel 112 can also determine an approximate location of a fire based on the received device IDs of fire detection devices 118 and the received pull station IDs from pull stations 119.

In some embodiments, fire alarm control panel 112 is configured to cause fire notification devices 114 and/or fire suppression devices 116 to activate in response to determining that a fire is present in building 10. In some embodiments, fire alarm control panel 112 uses a database of locations corresponding to each of the unique device IDs of fire detection devices 118 and pull stations 119. In some embodiments, fire alarm control panel 112 is configured to determine an approximate location in building 10 of the fire. In some embodiments, fire alarm control panel 112 is configured to cause particular fire notification devices 114 and particular fire suppression devices 116 to activate in response to determining that a fire is present in a particular room 160 of building 10.

For example, fire alarm control panel 112 may cause all of fire notification devices 114 to activate in response to determining that a fire is present in any room 160 of building 10. In some embodiments, fire alarm control panel 112 is configured to cause only fire suppression devices 116 that are proximate the location of the detected fire to activate. For example, fire alarm control panel 112 may cause all fire notification devices 114 to activate in response to determining a fire is present in one room 160 of building 10 (to cause occupants 150 to evacuate building 10) but may only activate fire suppression devices 116 that are in the particular room where the fire is present.

In some embodiments, fire detection devices 118 are configured to perform a fire detection process locally and are communicably connected with fire notification devices 114. In some embodiments, fire detection devices 118 are configured to provide fire alarm control panel 112 with an indication of whether a fire is present nearby fire detection devices 118. In some embodiments, fire detection devices 118 are configured to cause fire notification devices 114 to activate in response to determining that a fire is present nearby. In some embodiments, fire detection devices 118 are configured to control an operation of fire suppression devices 116. In some embodiments, fire detection devices 118 are configured to cause one or more (e.g., the nearest) of fire suppression devices 116 to activate in response to detecting a fire.

In some embodiments, fire alarm control panel 112 is configured to provide a status of fire system 100 to network 446 and/or BMS controller 366. For example, fire alarm control panel 112 may provide a status of each of fire suppression devices 116 (e.g., activated or dormant), a status of each of fire notification devices 114 (e.g., activated or dormant), a status of each of fire detection devices 118 (e.g., fire detected, no fire detected), and a status of each of pull stations 119 (e.g., activated). In some embodiments, fire alarm control panel 112 also provides network 446 and/or BMS controller 366 with a location of each of fire notification devices 114, fire suppression devices 116, fire detection devices 118, and pull stations 119. In some embodiments, the location includes a floor, room, and relative location within the room of each of fire notification devices 114, each of fire suppression devices 116, each of fire detection devices 118, and each of pull stations 119. For example, fire alarm control panel 112 may provide BMS controller 366 with a status of a particular fire detection device 118, as well as what floor the particular fire detection device 118 is on, as well as a room 160 that the particular fire detection device 118 is in and what wall of the room (e.g., north wall, west wall, etc.) 160 the particular fire detection device 118 is located on. In some embodiments, fire alarm control panel 112 is configured to provide BMS controller 366 with any of the received information from any or all of fire detection devices 118, any or all of pull stations 119, etc. For example, fire alarm control panel 112 may provide BMS controller 366 with any of the smoke detection data, the temperature sensor data, the light intensity data, etc., of each of fire detection devices 118 as well as the corresponding room 160 within which each of fire detection devices 118 are located.

Software Defined Fire Detection System

Referring to FIGS. 6 to 9*b*, a software defined fire detection system 600 for a building 10 is envisaged. The building 10 is defined by a plurality of zones. The fire detection system 600 comprises a plurality of sensors (608-611), a plurality of fire suppression devices 616, a plurality of fire response devices 704 associated with each of said zones, and further the fire detection system 600 comprises a fire panel 601. In some embodiments, a the plurality of sensors (608-611), the plurality of fire suppression devices 616, and the plurality of fire response devices (605-607) define loop forming zones 603, wherein the devices within the loop forming zones 603 may be represented as addressable loop devices 618. Typically, a loop is the physical wiring of the devices, i.e., devices in the same loop are physically connected by wires that lead back to the fire panel. Each addressable loop device 618 is associated with a unique device ID and a unique address. In accordance with an embodiment of the present disclosure, a zone may include one or more devices from other zones.

In an embodiment, the plurality of sensors (608-611) is spatially distributed within each of the zones of the building 10. Each of the plurality of sensors (608-611) is configured to periodically monitor a parameter indicative of the detection of fire, and is further configured to generate one or more fire detection signals, wherein the fire detection signal comprises zone information indicating the zone in which the fire is detected. In an exemplary embodiment, the plurality of sensors (608-611) is selected from the group consisting of, but is not limited to, break glass sensors 608, pull-down sensors 608, hose reel sensors 610, smoke detectors 611, fire detectors, sprinkler sensor 610, and heat detectors.

In an exemplary embodiment, the pull-down sensors 608 are configured to receive a manual input from an occupant 150 of building 10 to indicate the presence of a fire. Each pull-down sensor 608 may include a lever, a button, etc., configured to receive a user input indicating that a fire has occurred in building 10. In some embodiments, the pull-down sensors 608 are configured to provide a signal to the fire panel 601 regarding a status of the lever, button, etc. When an occupant 150 pulls the lever or pushes the button (or more generally inputs to any of pull-down sensors 608 that there is an emergency situation in the building 10), the pull-down sensors 608 provides the fire panel 601 with an indication that an occupant 150 of building 10 has actuated one of the pull-down sensor 608. In some embodiments, the indication which is the fire detection signal includes an identification of the particular pull-down sensor 608 that has been actuated and a location of the particular pull-down sensors 608, i.e., the zone information.

Further, the plurality of fire suppression devices 616 and the plurality of fire response devices 704 are associated with each of the zones of the building 10, wherein each of the fire response devices 704 and the fire suppression devices 616 are configured to be operated in either an actuation state or a de-actuated state. In an exemplary embodiment, the plurality of fire suppression devices 616 are selected from the group consisting of, but is not limited to, sprinklers, water hose reels, and fire extinguishers. In yet another exemplary embodiment, the plurality of fire response devices 704 are selected from the group consisting of, but is not limited to, shutters 606, doors 607, sirens 605, hooters, annunciators, HVAC fans and dampers. In another exemplary embodiment, one or more of the fire response devices 704 are enabled to provide audio and/or visual notifications upon actuation.

In accordance with an embodiment of the present disclosure, the fire panel 601 comprises a hard logic device 602*b* and a software defined alarm control unit 602*a*. The hard logic device 602*b* is communicatively coupled with the plurality of sensors (608-611), the plurality of fire response devices 704, and the plurality of fire suppression devices 616. The software defined alarm control unit (SDACU) 602*a* is implemented using a server, which may be a virtual server. The software defined alarm control unit 602*a* is configured to perform a plurality of supervisory and management related tasks, and is also configured to generate an alert data, subsequent to reception of at least one fire detection signal via the hard logic device 602*b*; generate an operating command to selectively operate one or more of the fire suppression devices 616 and fire response devices 704, subsequent to the reception of at least one fire detection signal via the hard logic device 602*b*; and provide a graphical user interface to display the present status of each zones, the plurality of sensors (608704-611), the fire response devices, and the fire suppression devices 616 based on the outcome of the supervisory and management related tasks.

In an embodiment of the present disclosure, the system 600 includes a diagnostic sensor mounted on a pipe connected to each of the fire suppression sensors respectively. Each of the diagnostic sensor (not specifically shown in the figures) is configured to: monitor the flow of water within the pipe, and generate an error signal if the flow of water is below a pre-defined threshold; detect the level of water flowing through the pipe, and generate the error signal if the level of water indicates empty of partially filled condition; detect the accumulation of debris in proximity of the sensor, and generate the error signal upon detection of debris; detect the temperature of water flowing through the pipe, and generate the error signal when the temperature of water is low indicating risk of freezing; and detect the leakage of water from the pipe, and generate the error signal if the leakage is detected. In an embodiment, each of the diagnostic sensor may be enabled to perform one or more of the abovementioned functions to generate the error signal. Further, the diagnostic sensor is configured to transmit the error signal towards the fore panel 601. In another embodiment, the diagnostic sensor may comprise one or more sensing units which may be configured to collectively perform the abovementioned functions to generate error signal(s).

The software defined alarm control unit 602*a*, of the fire panel 601 is configured to receive the error signal(s) from the diagnostic sensor via the hard logic device 602*b*. Subsequent to the reception of the error signal(s), the software defined alarm control unit 602*a* is configured to generate one or more notification signals to enable the hard logic device 602*b* to actuate one or more of the fire response devices 704.

In accordance with an embodiment of the present disclosure, the software defined alarm control unit 602*a* comprises a presentation layer 702 and a soft logic layer 705 both being implemented using one or more processor(s). In an embodiment, the processor implementing the soft logic layer 705 may be different than the processor implementing the presentation layer 702. Alternatively, same processor may be enabled to implement the soft logic layer 705 and the presentation layer 702.

The presentation layer 702 is enabled to provide a graphical user interface to display the present status of each of the zones of the building 10, the plurality of sensors 608-611), the fire response devices 704, and the fire suppression devices 616. Specifically, the present status of each zones may be defined based on at least one of the supervisory and management related tasks performed by the software defined alarm control unit 602*a*, the notification signals generated by the software defined alarm control unit 602*a*, and the alert data generated by the software defined alarm control unit 602*a*. Further, the soft logic layer 705 is configured to perform the plurality of supervisory and management related tasks, and is further configured to operate one or more fire suppression devices 616 and fire response devices 704 based on the received fire detection signal.

Figure 7:
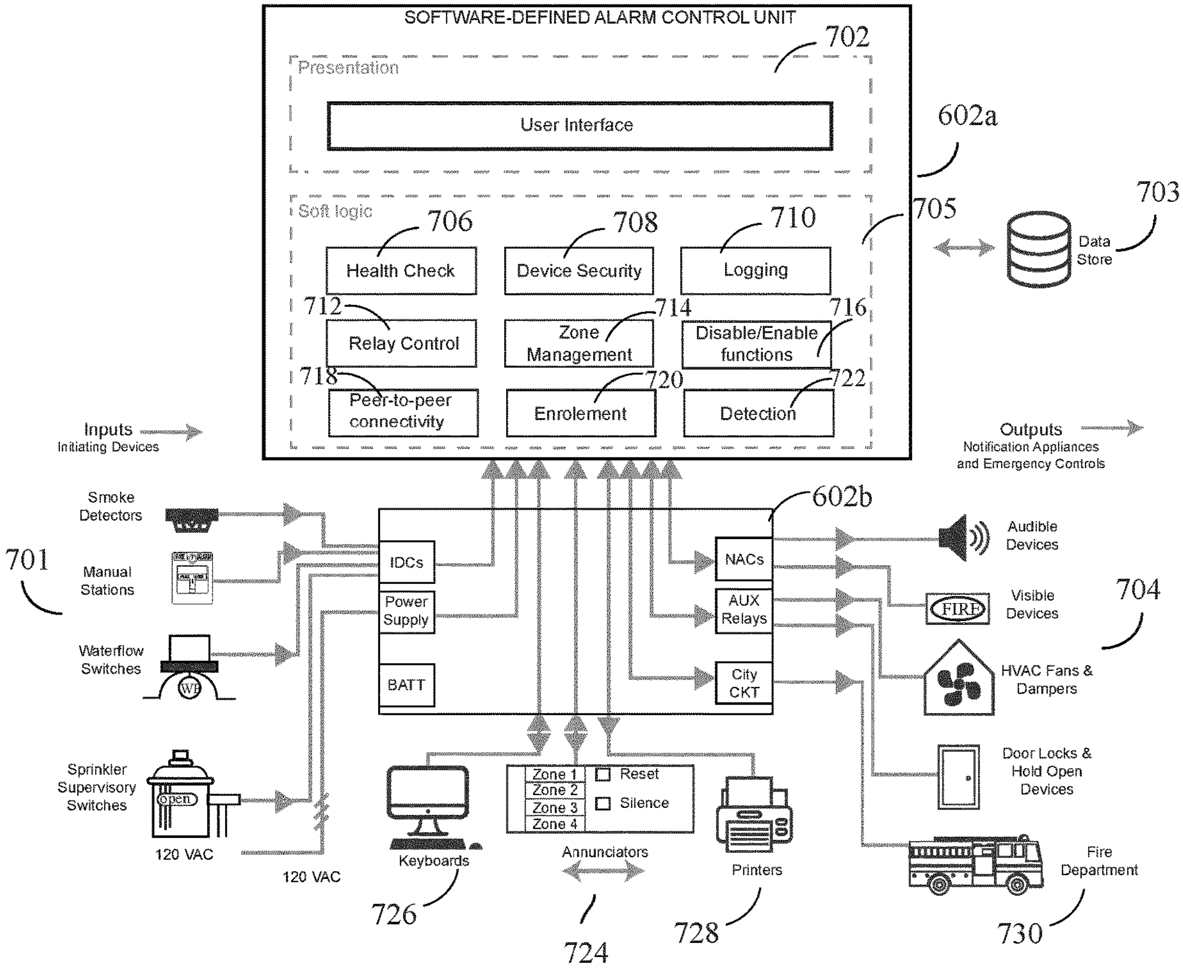
FIG. 7 illustrates a block diagram of the software defined alarm control unit of the fire detection system of FIG. 6.

In one embodiment of the present implementation, the supervisory and management related tasks performed by soft logic layer 705 comprises: detecting (at step 902), faulty or subpar performing sensors (608-611) or devices (704, 616) by enabling the at least one of the sensors (608-611), the fire suppression devices 616, and the fire response devices 704 to operate in a self-diagnosis mode; probing (at step 904), indicators associated with at least one of the sensors (608-611), the fire suppression devices 616, and the fire response devices 704, wherein the indicators correspond to the indication of either removal, tempering, or unauthorized usage of at least one of the sensors (608-611), the fire suppression devices 616, and the fire response devices 704; logging (at step 906), the current status of the sensors (608-611), the fire suppression devices 616, and the fire response devices 704 periodically or upon detecting change in the status of at least one of the sensors (608-611), the fire suppression devices 616, and the fire response devices; periodically sending (at step 908), command signals at a pre-defined intervals of time to relay devices, i.e., AUX relay (as shown in FIG. 7) that are enabled to either actuate or de-actuate the fire suppression devices 616 or fire response devices 704; re-defining (at step 910), the zones of at least one of the sensors (608-611), the fire suppression devices 616, and the fire response devices 704; establishing connection (at step 912) of the at least one of the sensors (608-611), the fire suppression devices 616, and the fire response devices 704 with peer fire detection systems; and enrolling (at step 914), at least one additional sensors (608-611), additional fire suppression devices 616, and additional fire response devices 704 in the system.

In an embodiment, the order in which the steps 902 to 916 affiliated to the supervisory and management related tasks may be performed by the soft logic layer in a varied order. In another embodiment, the soft logic layer may be configured to execute one or more steps (902 to 916), in any order, to perform the supervisory and management related tasks.

In one embodiment, the soft logic layer 705 comprises a detection module 722. The detection module 722 is configured to receive the fire detection signal from the hard logic device 602*b*, and is further configured to: identify, the zone of the one or more sensors (608-611) reporting said fire detection signal; identify, the plurality of fire suppression devices 616 and the plurality of fire response devices 704 associated with the zone identified based on the received fire detection signal; and generate, operating commands to actuate the fire suppression devices 616 and the fire response devices 704 associated with the identified zone, via the hard logic device. In an alternate embodiment, the detection module 722 may be enabled to actuate the fire response devices 704 associated with another zones.

Additionally, at step 916, soft logic layer 705 is configured to display the present status of each of the zones, sensors, fire suppression devices, and fire response devices. In an embodiment, the fire detection system includes a display console 614 that is communicatively coupled with the software defined alarm control unit 602*a* of the fire panel 601. The display console 614 is configured to display the present status of the fire detection system 600, wherein the present status includes the state of each of the zones, the plurality of fire suppression devices 616, and the plurality of fire response devices 704. In one embodiment, the presentation layer 702 may enable the display console to selectively display the status of the zones reporting fire detection signal by means of one or more sensors (608-611).

In another embodiment, the fire panel 601 and specifically the software defined alarm control unit 602*a* is communicatively coupled to a cloud storage 615, thereby facilitating supplementary monitoring, supervision, software provisioning, and firmware updates.

In an embodiment, the system 600 includes a communication interface 726 configured to facilitate a user to provide user-defined commands, wherein the user-defined command provided by the user correspond to rules for performing supervisory and management related tasks.

In one embodiment, the software defined alarm control unit 602*a* is configured to generate fire alert data by performing contextual based analysis on the received actuation signal. In still another embodiment of the present disclosure, the hard logic device 602*b* is provided with a city circuit (not specifically labelled) that is configured to provide the alert data to at least one emergency response team for taking necessary preventive actions. In one embodiment, the alert data may be transmitted towards a portable electronic device associated with one or more users to provide alerts.

Figure 8:
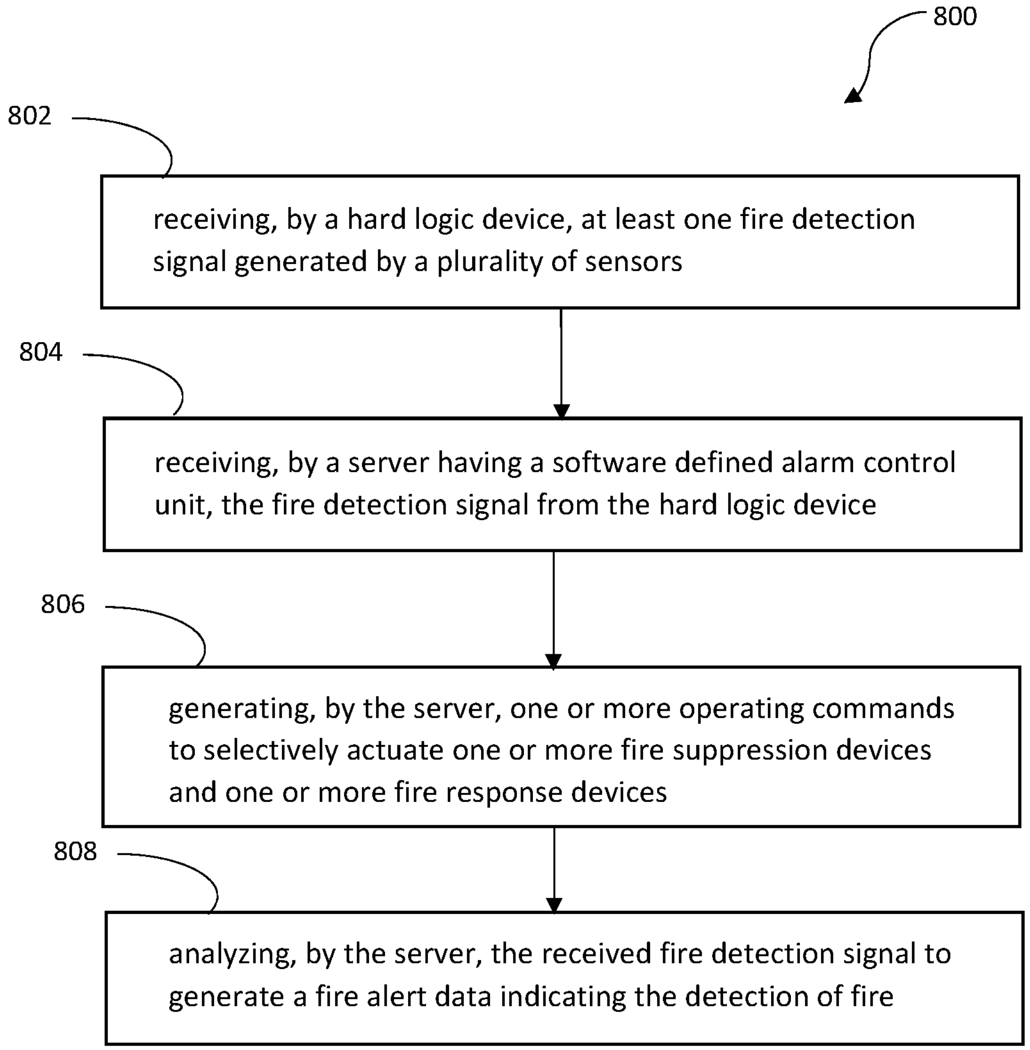
FIG. 8 illustrates is a flowchart depicting method for detecting fire in a building, in accordance with an embodiment.
Figure 9A:
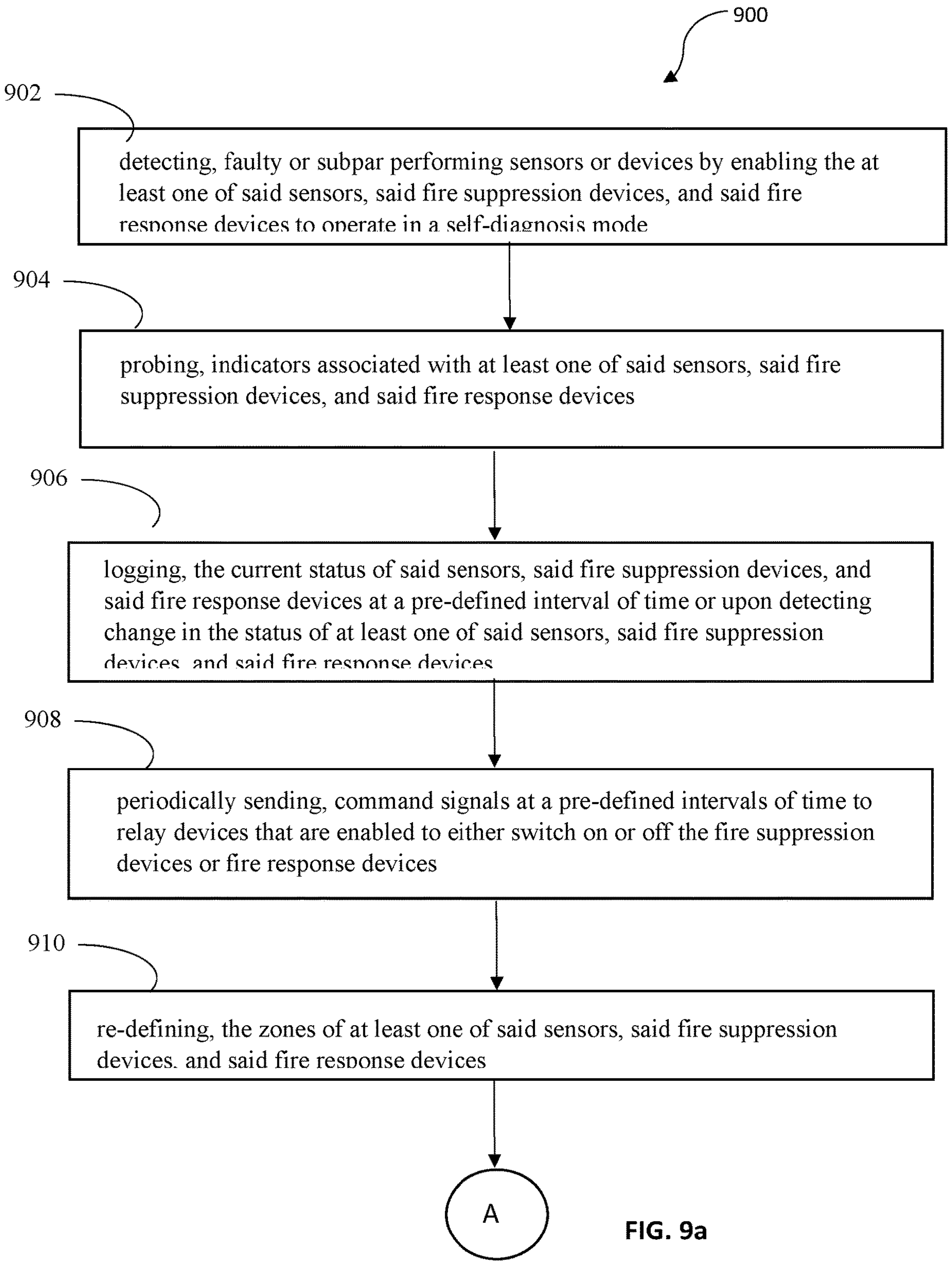
FIGS. 9*a* and 9*b* illustrate a flowchart depicting the steps performed by the software defined alarm control unit to perform supervisory and management related tasks, in accordance with one embodiment.
Figure 9B:
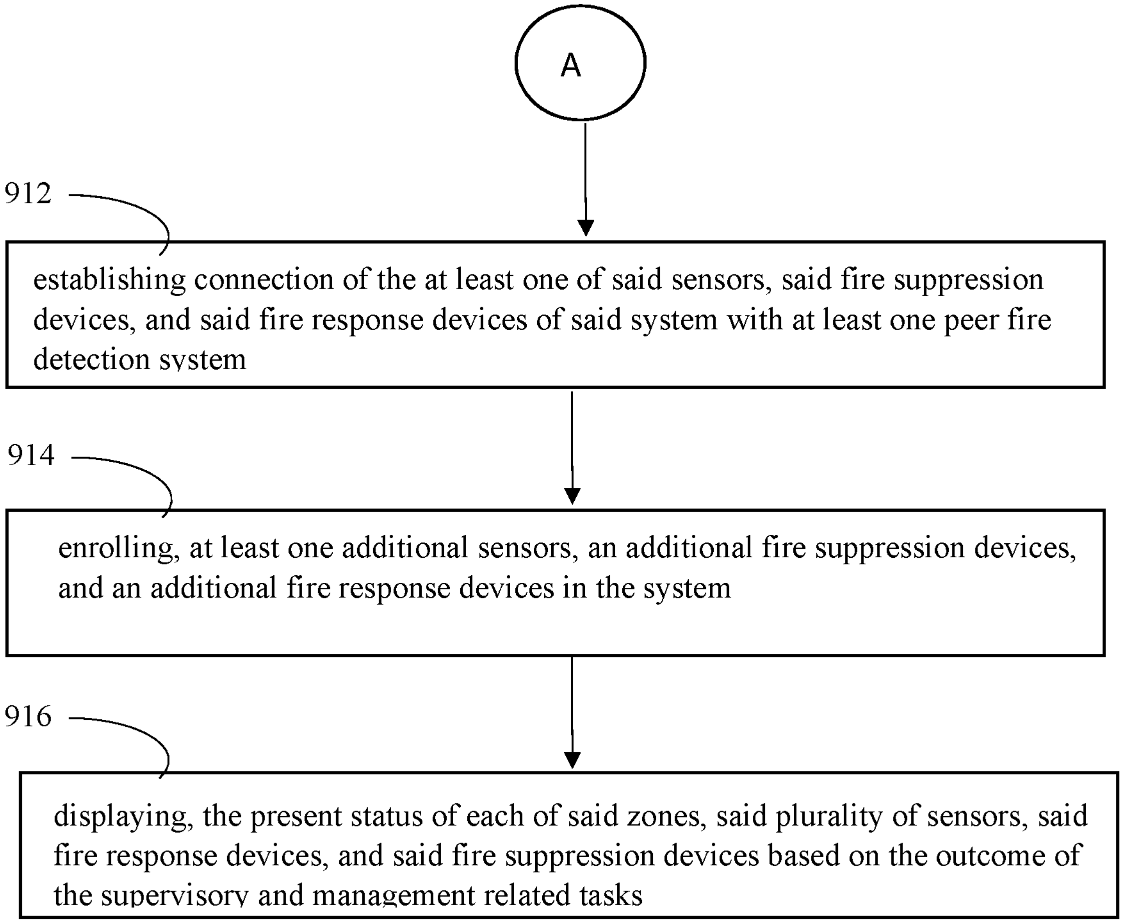
Figure 10:
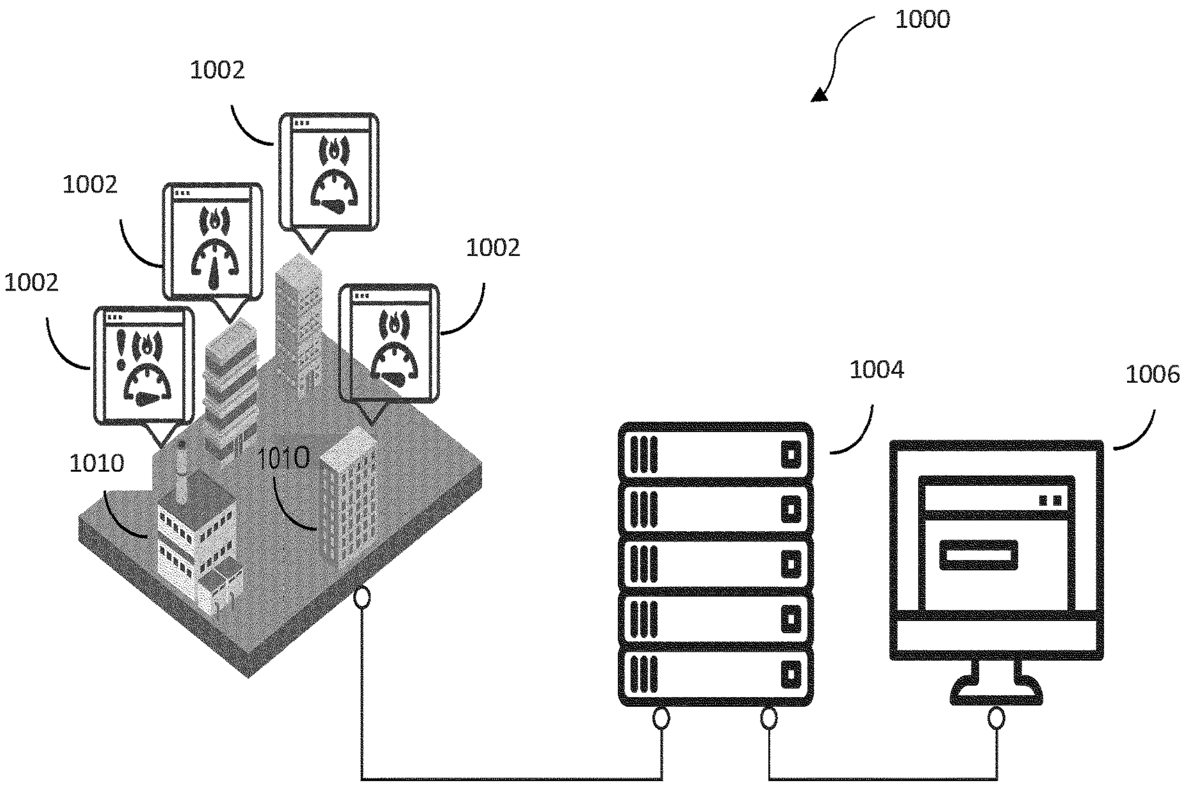
FIG. 10 illustrates a block diagram of a fire risk assessment system, in accordance with some embodiments.
Figure 11:
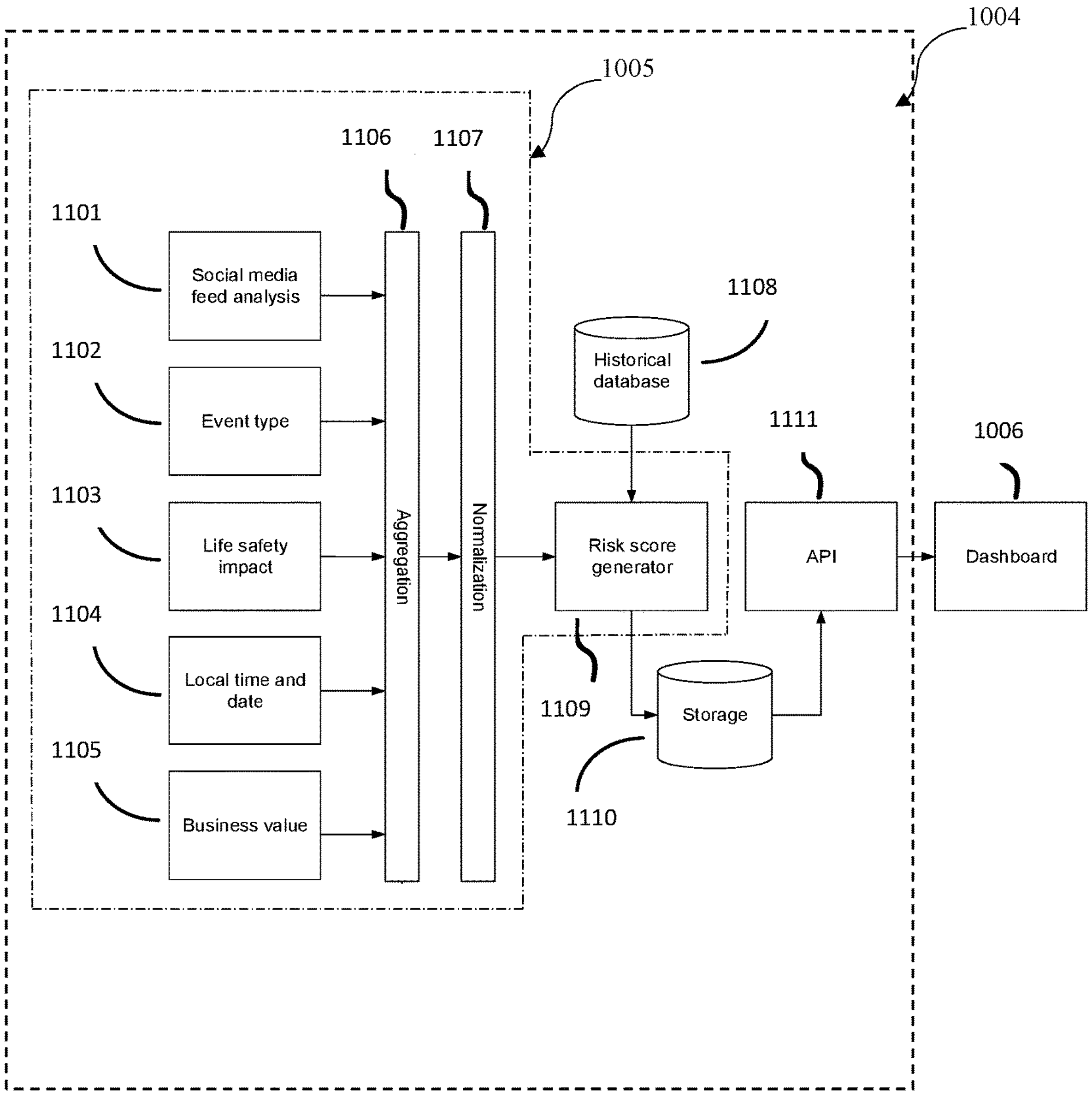
FIG. 11 illustrates a block diagram of the processing circuit of the risk assessment system of FIG. 10.

Referring to FIG. 8, in accordance with an embodiment of the present disclosure, a method 800 for detecting fire is envisaged. In an embodiment, the method for detecting fire in one or more zones defined within the building 10 include the steps of: receiving (at step 802), by a hard logic device 602*b*, at least one fire detection signal generated by a plurality of sensors (608-611), wherein the sensors are spatially distributed within each of the pre-defined zones and the fire detection signal comprises zone information indicating the zone in which the fire is detected. In an embodiment, the hard logic device 602*b* is a part of the fire panel 601 or fire alarm control panel. The method 800 further shows receiving (at step 804), by a server having a software defined alarm control unit 602*a*, the fire detection signal from the hard logic device 602*b*. In an embodiment, the server is a virtual server and is part of the fire panel 601. The software defined alarm control unit 602*a* includes a presentation layer 702 and a soft logic layer 705. Further, the method 800 include the steps of generating (at step 806), by the server, one or more operating commands to selectively actuate one or more fire suppression devices 616 and one or more fire response devices 704; and analyzing (at step 808), by the server, the received fire detection signal to generate a fire alert data indicating the detection of fire.

In some embodiments, the method includes a process 900 of performing a plurality of supervisory and management related tasks, by the server. The steps include: detecting (at step 902), faulty or subpar performing sensors or devices. In an embodiment, the server is configured to enable the sensors, the fire suppression devices, and the fire response devices to operate in a self-diagnosis mode to detect faulty sensor(s) and/or device(s). Further, steps of performing supervisory and management related tasks include probing (at step 904), indicators associated with at least one of the sensors, the fire suppression devices, and the fire response devices, wherein the indicators correspond to the indication of either removal, tempering, or unauthorized usage of at least one of the sensors, the fire suppression devices, and the fire response devices; and logging (at step 906), the current status of the sensors, the fire suppression devices, and the fire response devices at a pre-defined interval of time or upon detecting change in the status of at least one of the sensors, the fire suppression devices, and the fire response devices.

Still further, the steps of performing supervisory and management related tasks include periodically sending (at step 908), command signals at a pre-defined intervals of time to relay devices that are enabled to either switch on or off the fire suppression devices 616 or fire response devices 704; re-defining (at step 910), the zones of at least one of the sensors, the fire suppression devices, and the fire response devices; establishing connection (at step 912) of the at least one of the sensors, the fire suppression devices, and the fire response devices of the system with at least one peer fire detection systems; enrolling (at step 914), at least one additional sensors, additional fire suppression devices, and additional fire response devices in the system 600; and displaying (at step 916) the present status of each of the zones, the plurality of sensors, the fire response devices, and the fire suppression devices based on the outcome of the supervisory and management related tasks.

In an embodiment, the plurality of sensors is selected from the group consisting of break glass sensors, pull-down sensors, hose reel sensors, smoke detectors, fire detectors, sprinkler sensor, and heat detectors.

In some embodiments, the fire suppression devices being operated by the software defined alarm control unit correspond to the fire suppression devices deployed in the zone from which fire is detected by the one or more sensors.

Fire Panel

In one operative configuration of the present disclosure, a fire panel 601 for a fire detection system 600 of a building 10 having a plurality of zones defined therewithin is envisaged. Each zone is associated with a plurality of input devices 701, and at least one of or combination of a plurality of fire suppression devices 616 and a plurality of fire response devices 704. The fire panel 601 comprises a software defined alarm control unit 602*a* and a hard logic device 602*b*, wherein the hard logic device 602*b* is communicatively coupled with the software defined alarm control unit 602*a*, the plurality of input devices 701, the plurality of fire suppression devices 616, and the plurality of response devices 704. Specifically, the hard logic device 602*b* is configured to facilitate the communication of the software defined alarm control unit 602*a* with the input devices 701, the fire suppression devices 616, and the fire response devices 704.

The hard logic devices 602*b* comprises an initiating devices circuit (IDC), a notification appliance circuit (NAC), a power supply unit, an auxiliary power supply unit, relays, and a city circuit.

In an embodiment, the initiating device circuit is configured to enable the reception of one or more fire detection signals generated by the input devices 701, wherein the input devices are selected from the group consisting of, but is not limited to, break glass sensors, pull-down sensors 608, hose reel sensors 610, smoke detectors 611, fire detectors, sprinkler sensors 609, and heat detectors. In another embodiment, the initiating device circuit is configured to enable the reception of one or more error signals generated by the input devices 701, wherein the input devices 701 generating error signals are diagnostic sensors. These diagnostic sensors are mounted on a pipe connected to each of the fire suppression sensors 616. In an embodiment, the diagnostics sensors may be, but is not limited to, a sprinkler supervisory switch and a water flow switch.

In some embodiments, the notification appliance circuit is configured to facilitate the connection of the software defined alarm control unit 602*a* with the plurality of fire suppression devices 616 and the plurality of fire response devices 704. The notification appliance circuit is further configured to enable the transmission of one or more operating commands, generated by the software defined alarm control unit 602*a*, to at least one of or combination of the fire suppression devices 616 and fire response devices 704. In an embodiment, selective actuation of the fire suppression devices 616 and the fire response devices 704 may be determined based on the type of signal generated and reported by the input devices 701. For an instance, if error signal is received from the input devices 701 then only fire response devices 704 may be actuated. Similarly, if fire detection signal is being received from the input devices 701 then both of the fire response devices 704 and fire suppression devices 616 may be actuated.

In an embodiment, the fire response devices 704 may be audible devices 605, visible devices (not specifically labelled), HVAC fans and dampers (not specifically labelled), doors 607, shutters 606, and the like. The audible devices 605 may be configured to provide audio notification indicating detection of fire or error. The visible devices may be enabled to provide visual indication to indicate the detection of fire or error. Similarly, upon detection of fire, the doors 607 and shutters 606 may be laid open to facilitate quick evacuation of individuals those who may otherwise be trapped in the zone where fire is detected.

In an embodiment, the power supply unit, of the hard logic device 602*b*, is configured to draw power from the mains supply, and is further configured to supply power to the software defined alarm control unit 602*a*. In one embodiment, the input devices 701 may be enabled to draw power from the power supply unit of the hard logic device 602*b*. In some embodiments, the auxiliary power supply unit is provided within the hard logic device 602*b* to facilitate the supply of power to the software defined alarm control unit 602*a* in an event when the power supplied by the power supply unit is nil. The auxiliary power supply unit may contain one or more batteries, from which the auxiliary power may be supplied. Typically, during normal mode of operations, the battery of the auxiliary power supply unit may be enabled to receive the power from the power supply unit for charging, wherein one or more signal conditioning circuits may be provided within the auxiliary power supply unit to condition the power supplied by the power supply unit.

In some embodiments of the present disclosure, the software defined alarm control unit 602*a* is configured to perform a plurality of supervisory and management related tasks. The software defined alarm control unit 602*a* may be implemented using one or more processor(s). In a preferred embodiment, the software defined alarm control unit 602*a* is implemented using a virtual server. The software defined alarm control unit 602*a* is configured to generate one or more operating commands to selectively operate one or more fire suppression devices 616 and the fire response devices 704 based on the fire detection signal generated by at least one of the input devices.

In one implementation, the operating commands generated by the software defined alarm control unit 602*a* may be enabled to operate one or more fire suppression devices 616 and the fire response devices 704 associated with the zone from which the fire detection signal is being reported. Alternatively, in another implementation, the software defined alarm control unit 602*a* may be enabled to operate at least one of or combination of the fire suppression devices and the fire response devices associated with one or more zones. Further, the software defined alarm control unit (SDACU) is configured to generate a notification signal to actuate one or more of the fire response devices 704 based on the reception of error signal(s) generated by at least one of the input devices 701. In an embodiment, the notification signal is enabled to actuate the one or more fire response devices irrespective of their association with different zones. Still further, the software defined alarm control unit (SDACU) is configured to generate an alert data based on at least one of or combination of the fire detection signal and error signal. In some embodiments, the software defined alarm control unit 602*a* is configured to transmit the alert data to one or more remote servers associated with at least one emergency response team, wherein the alert data is transmitted by the software defined alarm control unit via the city circuit housed within the hard logic device 602*b*. In an embodiment, the emergency response team may be a fire department. In one embodiment, the alert data may be transmitted towards a portable electronic device associated with one or more users to provide alerts.

In an embodiment of the present disclosure, the software defined alarm control unit 602*a* includes a presentation layer 702 and a soft logic 705. The soft logic 705 is implemented using one or more processor(s), and includes a health check module 706, a device security module 708, a logging module 710, a relay control module 712, a zone management module 714, a disable/enable module 716, a peer-to-peer connectivity module 718, an enrolment module 720, and a detection module 722.

The health check module 706 is configured to detect faulty or subpar performing devices by enabling the at least one of the input devices 701, the fire suppression devices 616, and the fire response devices 704 to operate in a self-diagnosis mode.

The device security module 708 is configured to probe indicators associated with at least one of the input devices 701, the fire suppression devices 616, and the fire response devices 704, wherein the indicators correspond to the indication of either removal, tempering, or unauthorized usage of at least one of the input devices 701, the fire suppression devices 616, and the fire response devices 704.

The logging module 710 is configured to monitor and maintain a log of the current status or state of the input devices 701, the fire suppression devices 616, and the fire response devices 704 at a pre-defined interval of time or upon detecting change in the status of at least one of the input devices 701, the fire suppression devices 616, and the fire response devices 704.

The relay control module 712 is configured to periodically send command signals at pre-defined intervals of time to the relay devices that are enabled to switch either on or off the fire suppression devices 616 or fire response devices 704.

The zone management module 714 is configured facilitate re-defining of the zones of at least one of the input devices 701, the fire suppression devices 616, and the fire response devices 704. Typically, in ambit of the present disclosure, a single input devices 701 can be associated with more than one zone. Similarly, a single fire suppression device 616 or a single fire response device 704 may be associated with more than one zone.

The enable/disable module 716 is configured to set a state of the input devices 701, the fire suppression devices 616, and the fire response devices 704 as enabled state or disabled state.

The peer-to-peer connectivity module 718 is configured to facilitate communication by establishing connection of at least one of the input devices 701, the fire suppression devices 616, and the fire response devices 704 of the system 600 with one or more peer fire detection systems.

The enrolment module 720 is configured to facilitate addition of at least one of an additional input device, an additional fire suppression device, and an additional fire response device in the system.

In an embodiment, the detection module 722 is implemented using one or more processor(s), and is configured to receive the fire detection signal from the hard logic device 602*b*, and is further configured to:

- identify, the zone of the one or more input devices 701 reporting the fire detection signal;
- identify, the plurality of fire suppression devices 616 and the plurality of fire response devices 704 associated with the zone identified based on the received fire detection signal; and
- generate, operating commands to actuate any one of or combination of the fire suppression devices 616 and fire response devices 704 associated with the identified zone, via the hard logic device 602*b*.

In another embodiment, the detection module 722 is also enabled to perform the following tasks of:

- identifying, the zone of the one or more input devices 701 reporting the error signal;
- identifying, one or more fire response devices 704 associated with the zone identified based on the received error signal; and
- generate, notification signals to actuate one or more fire response devices 704 associated with the identified zone, via the hard logic device 602*b*.

Fire Detection and Risk Assessment System

Referring to FIGS. 6, 7, 10, and 11, in accordance with an embodiment of the present disclosure, a fire detection and risk assessment system for a building 1010 is described herein. The building 1010 is defined by a plurality of zones, wherein each zone is provided with a plurality of input devices 701 and at least one of or combination of a plurality of fire suppression devices 616 and a plurality of fire response devices 704. The plurality of input devices 701 is spatially distributed within the respective zones. In an embodiment, the zone of the building 1010 may correspond to a portion of an indoor space. In another embodiment, the zone of the building 1010 may correspond to an outdoor space in proximity of the building 1010 such as parking areas, outdoor siting areas, and the like. In an embodiment, each zone is associated with a plurality of fire suppression devices 616 and a plurality of fire response devices 704. In some embodiments of the present disclosure, one or more zones may only be associated with either the plurality of fire suppression devices 616 or the plurality of fire response devices 704 based on the location of the zone.

In accordance with the present disclosure, each of the input devices 701 is configured to generate at least one of a fire detection signal or an error signal. In an embodiment, the input devices configured to generate fire detections signals are plurality of sensors (608-611) configured to periodically monitor parameter indicative of the detection of fire, and subsequent to detection of fire they are enabled to generate the fire detection signal. In an exemplary embodiment, the plurality of sensors is selected from the group consisting of break glass sensors, pull-down sensors, hose reel sensors, smoke detectors, fire detectors, sprinkler sensor, and heat detectors. In some embodiments, the plurality of sensors are configured to generate the fire detection signal based on an action performed of an individual, i.e., breaking the glass of the break glass sensor, or maneuvering the level or switch of the pull down sensor. In other embodiments, the plurality of sensors are configured to monitor the ambient conditions, i.e., generation of smoke, rising temperature, and the like. In an embodiment, the sprinkler sensor may be configured to detect the actuation of an associated sprinkler, and generate fire detection signal. In another embodiment, the hose reel sensor may be configured to detect the unwinding of the hose reel and subsequent to complete unwinding of the hose reel, the fire detection signal may be generated.

In another embodiment, the input devices configured to generate error signals are diagnostic sensors. A diagnostic sensor is mounted on a pipe connected to each of the fire suppression sensors respectively. The diagnostic sensors are configured to: monitor the flow of water within the pipe connection the fire suppression sensor, and generate the error signal if the flow of water thorough the pipe is below a pre-defined threshold; detect the level of water flowing through the pipe, and generate the error signal if the level of water indicates empty or partially filled condition; detect the accumulation of debris in proximity of the sensor, and generate the error signal upon detection of debris; detect the temperature of water flowing through the pipe, and generate the error signal when the detected temperature of water is low indicating risk of freezing; and detect the leakage of water from the pipe, and generate the error signal if the leakage from the pipe is detected.

In an embodiment, the fire suppression devices may be selected from the group consisting of sprinklers, water hose reels, and fire extinguishers. In another embodiment, the fire response devices may be selected from the group consisting of shutters, doors, sirens, hooters, annunciators, HVAC fans and dampers.

The fire detection and risk assessment system of the present disclosure comprises a fire panel 601 and a risk assessment unit 1004. The fire panel 601 comprises a hard logic device 602*b* and a software defined alarm control unit (SDACU) 602*a*. The hard logic device 602*b* is communicatively coupled with the plurality of input devices 701, the plurality of fire response devices 704, and the plurality of fire suppression devices 616.

In some embodiments, the hard logic device 602*b* comprises an initiating device circuit (IDC). The initiating device circuit is an input circuit or a detection circuit that is configured to carry the signals generated by the input devices 701. Alternatively, the initiating device circuit is enabled to determine the change of state of the input devices 701, wherein upon detecting the change of state the software defined alarm control unit (SDACU) is notified by the initiating device circuit. In still another alternate embodiment, the initiating device circuit is enabled to perform self-diagnostics, wherein the health of the initiating device circuit's connection with the input devices 701 and the software defined alarm control unit (SDACU) 602*a* is evaluated and determined.

In accordance with an embodiment of the present disclosure, the initiating device is configured to: enable the reception of one or more fire detection signals generated by the plurality of sensors, i.e., input devices, and enable the reception of one or more error signals from the diagnostic sensors, i.e., input devices.

The notification application circuit, of the hard logic device 602*b*, is configured to facilitate the communication of the software defined alarm control unit 602*a* with the plurality of fire suppression devices 616 and the plurality of fire response devices 704. Additionally, the notification application circuit is configured to enable the transmission of one or more operating commands to one or more fire suppression devices 616 and fire response devices 704, and is further configured to enable the transmission of notification signals, generated by the SDACU 602*a*, to one or more fire response devices 704.

In accordance with the present disclosure, the software defined alarm control unit (SDACU) is implemented using a virtual server and specifically by one or more processor(s) of the virtual server. The software defined alarm control unit 602*a* is configured to perform a plurality of supervisory and management related tasks. Additionally, subsequent to reception of at least one fire detection signal, via the hard logic device, the SDACU 602*a* may be configured to: generate an operating command to selectively operate one or more of the fire suppression devices and fire response devices in actuated state; generate an alert data indicating the detection of fire, wherein the fire alert data comprises a building identifier and an event type data; and generate a notification signal based on the error signals generated by at least one of said input devices.

In an embodiment, the risk assessment unit 1004 of the present disclosure is implemented using a remote server having one or more processor(s) and/or controller(s). The risk assessment unit 1004 is communicatively coupled to the fire panel 601 of the fire detection units. In some embodiments, the risk assessment unit 1004 comprises a repository 1110 and a processing circuit 1005. The repository 1110 is configured to store a lookup table having a list of building identifiers, and a location coordinate corresponding to each of the building identifiers. In an embodiment, the processing circuit 1005 is implemented using one or more processor(s). The processing circuit 1005 is configured to cooperate with the repository to access the lookup table stored within the repository 1110. In an embodiment, the processing circuit 1005 is configured to identify the location of the building 1010 based on the building identifier contained within the fire alert data 1002. In a preferred embodiment, the processing circuit 1005 includes a crawler and extractor. The crawler and extractor is configured crawl through the lookup table to identify the received building identifier and extract the location coordinates corresponding to the identified building identifier, wherein the extracted location coordinates corresponds to the location of the building 1010 reporting fire alert data 1002. Further, the processing circuit 1005 is configured to contextually analyze the fire alert data 1002 with any one of or combination of the identified location of the building 1010 and the event type data, and is based on a plurality of pre-defined risk assessment parameters to generate a risk score corresponding to each of the risk assessment parameters. Still further, the processing circuit 1005 is configured to aggregate the risk score of each of the risk assessment parameters to generate an aggregated risk score and subsequently, normalize the aggregated risk score to generate a normalized risk score. The processing circuit 1005 is also configured to determine a contextual risk score by evaluating the normalized risk score with historical data thereby classifying the received fire alert data as any one of a low risk event, a moderate risk event, and a high risk event.

In an embodiment, the risk assessment parameters are selected from the group consisting of, but is not limited to, social media feeds, event type, life safety impact, local time and date, and business value.

Risk Assessment System

In one implementation of the present disclosure, a computer implemented fire risk assessment system 1000 is disclosed. The fire risk assessment system 1000 comprises a plurality of fire detection units, and a server 1004. In an embodiment, the server 1004 is a remote server associated with one or more emergency response team. In another embodiment, the fire detection units may correspond to the fire detection system 600 described hereinabove.

In some embodiments, the fire detection units are implemented using one or more processor(s). Each of the fire detection unit is associated with a building 1010, and is configured to generate a fire alert data 1002 having a building identifier and an event type data.

In an embodiment, the server 1004 is communicatively coupled with the fire detection units of each of the building 1010, and is configured to receive at least one fire alert data 1002 from one or more fire detection units. The server 1004 may be communicatively coupled with the fire detection units by means of a communication interface which may include wired or wireless communications interfaces (e.g., jacks, antennas, transmitters, receivers, transceivers, wire terminals, etc.) for conducting data communications. In various embodiments, the communication interface can be direct (e.g., local wired or wireless communications) or via a communications network (e.g., a WAN, the Internet, a cellular network, etc.). For example, communication interface can include an Ethernet card and port for sending and receiving data via an Ethernet-based communications link or network. In another example, the communication interface can include a Wi-Fi transceiver for communicating via a wireless communications network. In another example, the communication interface can include cellular or mobile phone communications transceivers.

In some embodiments, the server 1004 comprises a repository 1110 and a processing circuit 1005. The repository 1110 may be enabled to store a lookup table having a list of building identifiers, and a location coordinate corresponding to each of the building identifiers. In an embodiment, the repository 1110 may be configured to store a pre-defined first risk score and a pre-defined second risk score. The processing circuit 1005 may be enabled to cooperate with the repository 1110 to access the stored lookup table.

The processing circuit 1005 may be configured to identify the location of the building 1010 based on the building identifier contained within the fire alert data 1002. In an embodiment, the processing circuit 1005 may be configured to crawl through the lookup table to identify the received building identifier and extract the location coordinates corresponding to the identified building identifier, wherein the extracted location coordinates corresponds to the location of the building 1010 reporting the fire alert data 1002. Further, the processing circuit 1005 is configured to: contextually analyze the fire alert data 1002 with any one of or combination of the identified location of the building and the event type data based on a plurality of pre-defined risk assessment parameters to generate a risk score corresponding to each of the risk assessment parameters; aggregate the risk score of each of the risk assessment parameters to generate an aggregated risk score; normalize the aggregated risk score to generate a normalized risk score; and a contextual risk score by evaluating the normalized risk score with historical data, and subsequently classify the received fire alert data as any one of a low risk event, a moderate risk event, and a high risk event.

In an operative configuration of the present implementation, the processing circuit 1005 includes a social media feed analyzer 1101, an event type analyzer 1102, a life safety impact analyzer 1103, a time and date analyzer 1104, and a business value analyzer 1105. The social media feed analyzer 1101 is configured to determine a first risk score by performing social media feed analysis to identify the sources of risk in proximity of the location of the building 1010 reporting fire alert data 1002, wherein the value of the first risk score is directly proportional to the number of identified sources of risk. The event type analyzer 1102 is configured to determine a second risk score by performing event type data analysis, wherein the second risk score is based on the type of the event.

The life safety impact analyzer 1103 is configured to determine a third risk score by identifying the presence of people in the vicinity of the building 1010, wherein the value of the third risk score is directly proportional to human density in the vicinity of the building 1010. The time and date analyzer 1104 is configured to determine a fourth risk score by identifying the time and date of receiving the fire alert data, wherein the value of the fourth risk score is higher for the time and date when human population is expected to be at peak. The business value analyzer 1105 is configured to determine a fifth risk score by identifying the value of assets under threat, wherein the value of fifth risk score is directly proportional to the value of assets under threat. In an embodiment, each of the social media feed analyzer 1101, the event type analyzer 1102, the life safety impact analyzer 1103, the time and date analyzer 1104, and the business value analyzer 1105 may be implemented using one or more processor(s).

In one embodiment, the processing circuit 1005 may further include an aggregator 1106, a data normalizer 1107, and a risk score generator 1109. In an alternate embodiment, the aggregator 1106, the data normalizer 1107, and the risk score generator 1109 may be enabled using a separate processing circuit having one or more processor(s). The aggregator 1106 may be configured to cooperate with a social media feed analyzer 1101, an event type analyzer 1102, a life safety impact analyzer 1103, a time and date analyzer 1104, and a business value analyzer 1105 to receive and aggregate the first, second, third, fourth and fifth risk scores respectively to generate an aggregated risk score. The data normalizer 1107 may be configured to cooperate with the aggregator 1106 to receive the aggregated risk score, and may be further configured to normalize the aggregated risk score to generate a normalized risk score.

Further, the risk score generator 1109 may be configured to cooperate with the data normalizer 1107 to determine contextual risk score by analyzing the normalized risk score with historical data retrieved from a historical database 1108, and further configured to classify the received fire alert data as any one of the low risk event, the moderate risk event, and the high risk event. In an embodiment, the risk score generator 1109 is configured to receive the normalized risk score from the data normalizer 1107, and the first and the second pre-defined risk scores from the repository 1110. The risk score generator 1109 is configured to determine the contextual risk score by analyzing the normalized risk score with historical data received from the historical database 1108, and is further configured to compare the contextual risk score with the first and second pre-defined risk score to classify the received fire alert data 1002 as any one of low risk event, moderate risk event, and high risk event.

Specifically, the risk score generator 1109 is configured to: classify the received fire alert data as the low risk event when the contextual risk score is below the first pre-defined risk score; classify the received fire alert data as moderate risk event when the contextual risk score is between the first pre-defined risk score and the second pre-defined risk score; and classify the received fire alert data as high risk event when the contextual risk score is greater than the second pre-defined risk score.

In an embodiment, the processing circuit 1005 is configured to periodically perform the contextual analysis on the pre-defined risk assessment parameters to re-calculate the risk score for each of the pre-defined risk assessment parameters and thereby update the contextual risk score and risk classification. Further, the processing circuit 1005 may be configured to periodically time stamp the contextual risk score, and store the time stamped contextual risk score in the repository 1110 and the historical database 1108.

In another embodiment, the risk score generator 1109, of the processing circuit 1005, is configured to store the contextual risk score in the repository 1110, and is further communicatively coupled to a display console 1006 to display the determined contextual risk score along with the classification of the fire alert data as any one of the low risk event, the moderate risk event, and the high risk event. In an exemplary embodiment, the display console 1006 is communicatively coupled with the processing circuit 1005 and specifically with the risk score generator by means of an application programming interface (API) 1111.

In another embodiment, the risk assessment parameters are selected from the group consisting of social media feeds, event type, life safety impact, local time and date, and business value.

Figure 12:
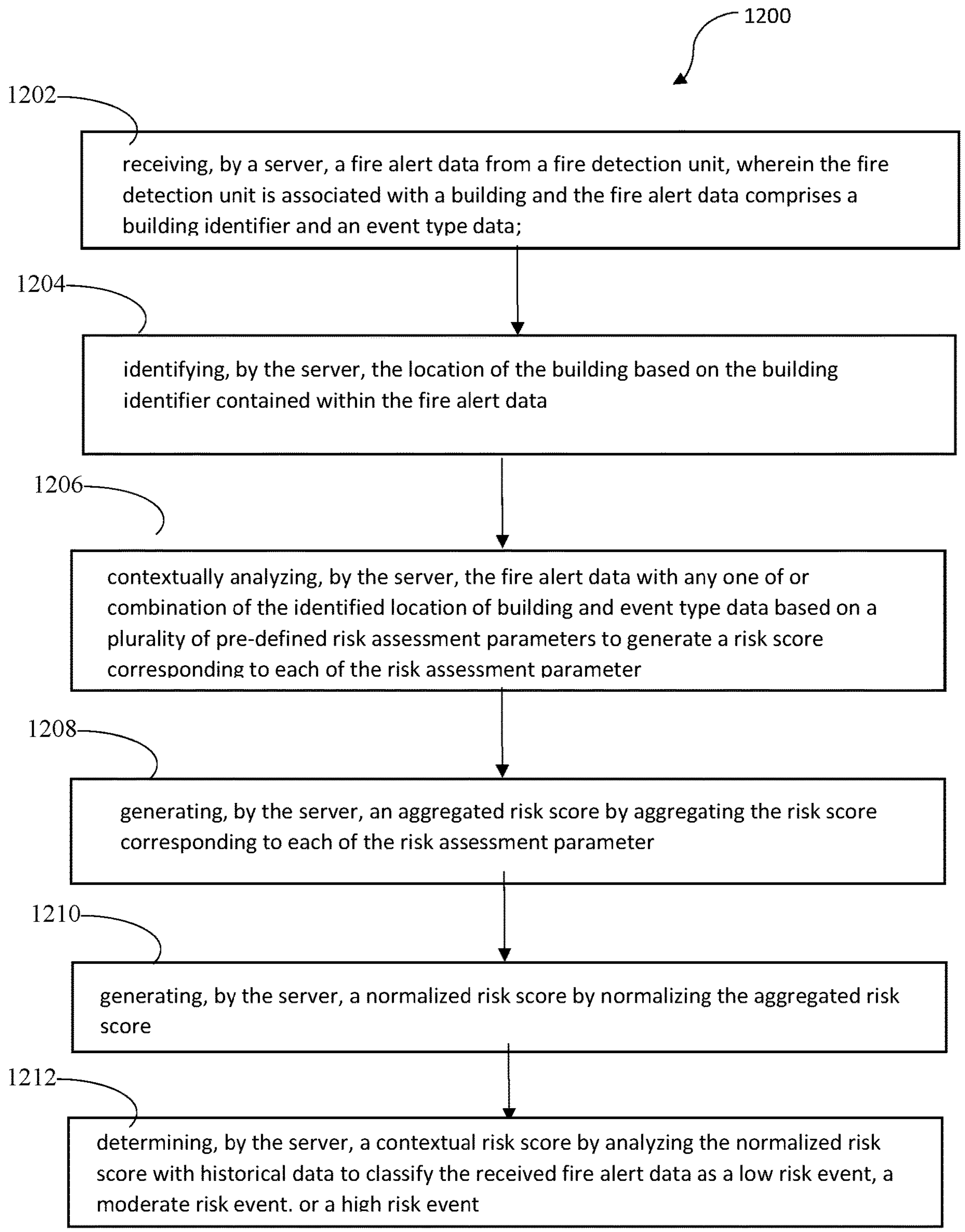
FIG. 12 illustrates a flowchart depicting steps of performing fire risk assessment, in some embodiments.

Referring to FIG. 12, in accordance with an embodiment of the present disclosure, a method 1200 for performing contextual based risk assessment is envisaged, wherein the process of performing contextual based risk assessment is performed by a processing circuit 1005 of the server 1004. The method comprises the steps of receiving (at step 1202), one or more fire alert data having a building identifier and an event type data from a fire detection unit. In an embodiment, the fire detection unit may be the fire detection system described in the preceding sections of the description. Further, at step 1204, the method 1200 shows to include identifying, the location of the building based on the building identifier contained within the fire alert data. At step 1206, the method 1200 shows performing contextual analysis on the received fire alert data base on any one of or combination of the identified location of the building and an event type data to generate a plurality of risk scores. In an embodiment, the location coordinates of each building corresponds to a building identifier stored in a repository. Still further, the method 1200, at step 1208 shows aggregating, the risk score corresponding to each of the risk assessment parameters to generate an aggregated risk score, and at step 1210, the method shows normalizing the aggregated risk score to generate a normalized risk score. Subsequently, at step 1212, the method 1200 shows to include determining the contextual risk score by analyzing the normalized risk score with historical data, wherein the historical data is stored in the repository. In an embodiment, the historical data is stored in a historical data wherein in order to determine contextual risk score, the historical data is fetched from the historical database. Further, the method shows classifying, the received fire alert data as one of a low risk event, a moderate risk event, and a high risk event is based on the value of the contextual risk score.

In one embodiment, the step of performing contextual analysis based on any one of or combination of the location of the building and event type data to generate the plurality of risk sores is performed by the following sub steps. The sub steps include: determining a first risk score by performing social media feed analysis to identify the sources of risk in proximity of the location of the building reporting fire alert data, wherein the value of said first risk score is directly proportional to the number of identified sources of risk; determining a second risk score by performing event type data analysis, wherein the second risk score is based on the type of said event; determining a third risk score by identifying the presence of people in the vicinity of the building, wherein the value of said third risk score is directly proportional to human density in the vicinity of the building; determining a fourth risk score by identifying the time and date of receiving the fire alert data, wherein the value of the fourth risk score is higher for the time and date when human density is expected to be at peak; and determining a fifth risk score by identifying the value of assets under threat, wherein the value of the fifth risk score is directly proportional to the value of assets under threat.

In still another embodiment, the repository is configured to store a fire pre-defined risk score and a second pre-defined risk score, and wherein the step of classifying, the received fire alert data as one of the low risk event, the moderate risk event, and the high risk event based on the value of the contextual risk score is performed by the following sub steps. The sub steps include: receiving the first and second pre-defined risk score from the repository; comparing the contextual risk score with the first and second pre-defined risk scores; and classifying the received fire alert data as low risk event, moderate risk event, and high risk event, wherein the fire alert data is classified as low risk event when the contextual risk score is below the first pre-defined risk score, the received fire alert data is classified as the moderate risk event when the contextual risk score is between the first pre-defined risk score and a second pre-defined risk score, and the received fire alert data is classified as the high risk event when the contextual risk score is greater than the second pre-defined risk score.

Additionally, in an embodiment, the method includes the step of displaying the determined contextual risk score along with the classification of the fire alert data as any one of a low risk event, a moderate risk event, and a high risk event on a dashboard of the display console 1006.

Technical Advancement

The fire panel having SDACU and hard logic device which is low powered, as disclosed in the present disclosure replaces conventional fire panels. The SDACU is implemented using a server that includes software architecture supporting a soft logic layer and a presentation layer. The hard logic device is enabled to perform any of the functions of a traditional fire panel that cannot be virtualized (hard logic and IO). In the context of this invention, an example of an application of the hard logic layer is the control of sounders and alarms linked to fire detection events. An example of an application the soft logic layer is a complex event process that alerts specific personnel based on the contextual information surrounding a fire detection event.

As compared to the conventional fire panels/fire control panels, present disclosure envisages the fire detection system with a fire panel, having following advantages, but is not limited to, that:

can be easily backed up and replicated, thereby removing the fire panel as a potential single point of failure and provides a mechanism for high availability;
- is centralized, thereby simplifying the task of changing individual elements, updating device firmware, and reconfiguring the system for different layouts;
- facilitates dynamic allocation of resources, i.e., the model can accommodate several fire systems in parallel. If any system requires more memory or CPU resources, the model can dynamically balance the increased resource requirement;
- is more scalable, i.e., additional computing resources can be allocated to support additional sensors and hardware devices;
- eliminates the requirement of replacing the fire panels for providing increased functionality or features;
- employs low powered physical hardware, thereby reducing the overall cost of the fire detection system;
- can support complex and dynamic automation; and
- provides a cloud-ready infrastructure.

Additionally, the risk assessment of the present disclosure determines a fire specific risk score that is automatically calculated from contextual data surrounding an alarm or alert event that can be used to prioritize events.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A server computing device comprising one or more processors and one or more memories having instructions stored thereon that, when executed by the one or more processors, cause the server computing device to implement functions of a software defined alarm control unit (SDACU) to:

receive, from one or more sensors distributed within a building, a fire detection signal indicating an event;

generate a first risk score for the event by contextually analyzing the fire detection signal using an aggregated risk score based on individual risk scores for a plurality of pre-defined risk assessment parameters and generate a second risk score for the event by evaluating the first risk score against historical data comprising a historical value of the first risk score, wherein the plurality of pre-defined risk assessment parameters are selected from a group consisting of a social media feed, an event type, a local time and date, and a business value;

generate, based on the second risk score, an operating command for one or more fire response devices associated with the building; and control the one or more fire response devices using the operating command to respond to the fire detection signal.

2. The server computing device of claim 1, wherein the fire detection signal is received from at least one of a glass break sensor, a pull-down sensor, a hose reel sensor, a smoke detector, a fire detector, a sprinkler sensor, or a heat detector.

3. The server computing device of claim 1, further configured to continuously monitor at least one of the one or more sensors or the one or more fire response devices to determine a status of the at least one of the one or more sensors or the one or more fire response devices.

4. The server computing device of claim 3, wherein the status indicates at least one of device removal, tampering, or unauthorized usage.

5. The server computing device of claim 1, wherein controlling the one or more fire response devices includes controlling at least one of a sprinkler, a window shutter, a door, an alarm, an HVAC component, a carbon-dioxide deployment device, or an inert-gas deployment system.

6. The server computing device of claim 1, wherein the one or more fire response devices include a fire suppression device.

7. The server computing device of claim 1, wherein the fire detection signal is received from a hardware logic layer communicably coupled between the one or more sensors and the server computing device.

8. The server computing device of claim 1, wherein implementing functions of the software defined alarm control unit (SDACU) includes at least one of augmenting operation of an existing fire panel associated with the building or performing functions associated with a traditional fire panel without the traditional fire panel.

9. A fire detection system, comprising:

a hardware logic device communicably coupled to one or more sensors distributed within a building; and a server comprising one or more processors and one or more memories having instructions stored thereon that, when executed by the one or more processors, cause the server to implement functions of a software defined alarm control unit (SDACU) to:

receive, from the hardware logic device, a fire detection signal indicating an event;

generate a first risk score for the event by contextually analyzing the fire detection signal using an aggregated risk score based on individual risk scores for a plurality of pre-defined risk assessment parameters and generate a second risk score for the event by evaluating the first risk score against historical data comprising a historical value of the first risk score, wherein the plurality of pre-defined risk assessment parameters are selected from a group consisting of a social media feed, an event type, a local time and date, and a business value;

generate, based on the second risk score, an operating command for one or more fire response devices associated with the building; and control the one or more fire response devices using the operating command to respond to the fire detection signal.

10. The fire detection system of claim 9, wherein the hardware logic device receives the fire detection signal from at least one of a glass break sensor, a pull-down sensor, a hose reel sensor, a smoke detector, a fire detector, a sprinkler sensor, or a heat detector.

11. The fire detection system of claim 9, wherein the instructions further cause the server to continuously monitor at least one of the one or more sensors or the one or more fire response devices to determine a status of the at least one of the one or more sensors or the one or more fire response devices.

12. The fire detection system of claim 11, wherein the status indicates at least one of device removal, tampering, or unauthorized usage.

13. The fire detection system of claim 9, wherein controlling the one or more fire response devices includes controlling at least one of a sprinkler, a window shutter, a door, an alarm, an HVAC component, a carbon-dioxide deployment device, or an inert-gas deployment system.

14. The fire detection system of claim 9, wherein the one or more fire response devices include a fire suppression device.

15. The fire detection system of claim 9, wherein implementing functions of the software defined alarm control unit (SDACU) includes at least one of augmenting operation of an existing fire panel associated with the building or performing functions associated with a traditional fire panel without the traditional fire panel.

16. A method for fire detection in one or more zones of a building, comprising:

receiving, by a server implementing a software defined alarm control unit (SDACU) from one or more sensors distributed within the building, a fire detection signal indicating an event;

generating, by the server, a first risk score for the event by contextually analyzing the fire detection signal using an aggregated risk score based on individual risk scores for a plurality of pre-defined risk assessment parameters and generating a second risk score for the event by evaluating the first risk score against historical data comprising a historical value of the first risk score, wherein the plurality of pre-defined risk assessment parameters are selected from a group consisting of a social media feed, an event type, a local time and date, and a business value;

generating, by the server based on the second risk score, an operating command for one or more fire response devices associated with the building; and controlling, by the server, the one or more fire response devices using the operating command to respond to the fire detection signal.

17. The method of claim 16, wherein the server receives the fire detection signal from at least one of a glass break sensor, a pull-down sensor, a hose reel sensor, a smoke detector, a fire detector, a sprinkler sensor, or a heat detector.

18. The method of claim 16, further comprising continuously monitoring, by the server, at least one of the one or more sensors or the one or more fire response devices to determine a status of the at least one of the one or more sensors or the one or more fire response devices.

19. The method of claim 18, wherein the status indicates at least one of device removal, tampering, or unauthorized usage.

20. The method of claim 16, wherein controlling the one or more fire response devices includes controlling at least one of a sprinkler, a window shutter, a door, an alarm, an HVAC component, a carbon-dioxide deployment device, or an inert-gas deployment system.

* * * * *